(12) United States Patent
Higashitaniguchi et al.

(10) Patent No.: US 7,532,634 B2
(45) Date of Patent: May 12, 2009

(54) RESILIENT PACKET RING DEVICE

(75) Inventors: Atsuko Higashitaniguchi, Yokohama (JP); Hiroshi Kinoshita, Yokohama (JP); Akira Tokunaga, Yokohama (JP); Yoshihiro Shimizu, Fukuoka (JP); Takanori Choumaru, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 645 days.

(21) Appl. No.: 11/054,538

(22) Filed: Feb. 10, 2005
(Under 37 CFR 1.47)

(65) Prior Publication Data
US 2005/0243845 A1 Nov. 3, 2005

Related U.S. Application Data

(63) Continuation of application No. PCT/JP03/01442, filed on Feb. 12, 2003.

(51) Int. Cl.
*H04L 12/28* (2006.01)
(52) U.S. Cl. .................. 370/404; 370/406
(58) Field of Classification Search .......... None
See application file for complete search history.

(56) References Cited

U.S. PATENT DOCUMENTS

| | | | |
|---|---|---|---|
| 4,706,081 | A | 11/1987 | Hart et al. |
| 5,220,562 | A | 6/1993 | Takada et al. |
| 7,088,675 | B1 * | 8/2006 | Meyer .................. 370/225 |
| 7,102,997 | B2 * | 9/2006 | Sultan et al. ........... 370/233 |
| 7,219,147 | B2 * | 5/2007 | Kimura et al. ......... 709/224 |
| 7,260,097 | B2 * | 8/2007 | Casey ................... 370/392 |
| 7,369,504 | B2 * | 5/2008 | Davis ................. 370/236.1 |
| 2003/0074469 | A1 * | 4/2003 | Busi et al. ............. 709/238 |
| 2003/0112829 | A1 * | 6/2003 | Sridhar ................. 370/522 |
| 2003/0118041 | A1 * | 6/2003 | Fontana et al. ......... 370/404 |
| 2003/0177258 | A1 * | 9/2003 | Kulkarni et al. ........ 709/236 |
| 2004/0202171 | A1 | 10/2004 | Hama |
| 2004/0208554 | A1 * | 10/2004 | Wakai et al. ............ 398/54 |
| 2005/0063396 | A1 * | 3/2005 | Yu ....................... 370/401 |
| 2005/0249233 | A1 * | 11/2005 | Akaba et al. ........... 370/432 |

FOREIGN PATENT DOCUMENTS

JP 61-144148 7/1986

(Continued)

OTHER PUBLICATIONS

Notice of Reason for Rejection issued in corresponding Japanese Patent Application 2004-568173 dated Nov. 6, 2007.

*Primary Examiner*—Phirin Sam
(74) *Attorney, Agent, or Firm*—Staas & Halsey LLP

(57) ABSTRACT

A resilient packet network (RPR) device is connected to one or more rings to constitute an RPR network. The RPR device has a storage unit in which a correspondence between RPR device addresses, each indicating an RPR device connected to the one or more rings, and user device addresses, each indicating a user device accommodated in the RPR device, is stored. When the RPR device receives data addressed to a predetermined user device from a user device accommodated in the RPR device itself, if an RPR device address of an RPR device accommodating the predetermined user device is registered in the storage unit, an RPR header, in which the RPR device address is set as a destination RPR device address, is added to the data. The data with the RPR header is transmitted to the RPR network.

22 Claims, 29 Drawing Sheets

FOREIGN PATENT DOCUMENTS

| | | |
|---|---|---|
| JP | 61-238141 | 10/1986 |
| JP | 1-129550 | 5/1989 |
| JP | 3-72739 | 3/1991 |
| JP | 3-101437 | 4/1991 |
| JP | 2002-164937 | 6/2002 |
| WO | WO 00/11888 A2 | 3/2000 |

\* cited by examiner

RPR HEADER:
- RING CONTROL
- DESTINATION RPR-MAC ADDRESS
- SOURCE RPR-MAC ADDRESS
- CONTROL VERSION
- CONTROL TYPE
- HEADER CHECKSUM

PAYLOAD

FCS

TOPOLOGY DETECTION MESSAGE

INFORMATION FOR SETTING TOPOLOGY DETECTION MESSAGE

| FIELD NAME | SET VALUE |
|---|---|
| DESTINATION RPR-MAC ADDRESS | 00-00-00-00-00-00 |
| SOURCE RPR-MAC ADDRESS | 00-E0-00-00-22-01 |
| CONTROL VERSION | 0 |
| CONTROL TYPE | 1 (TOPOLOGY DETECTION) |

FIG. 12

| DESTINATION MAC ADDRESS |
| SOURCE MAC ADDRESS |
| TYPE/LENGTH |

} MAC HEADER

| DATA |
| FCS |

ARP REQUEST PACKET

FIG. 13

INFORMATION FOR SETTING ARP REQUEST PACKET

| FIELD NAME | SET VALUE |
|---|---|
| DESTINATION MAC ADDRESS | 00-00-00-00-00-00 |
| SOURCE MAC ADDRESS | 00-E0-00-00-33-01 |
| TYPE/LENGTH | 0x0806 (ARP) |

FIG. 14

MAC ADDRESS LEARNING TABLE
(RPR DEVICE 4)

| USER DEVICE MAC ADDRESS | PORT NUMBER |
|---|---|
| 00-E0-00-00-33-01 | a |
| ⋮ | |

RETRIEVE BY USING MAC ADDRESS

RPR DATA PACKET (ARP REQUEST)

INFORMATION FOR SETTING RPR DATA PACKET (ARP REQUEST)

| FIELD NAME | SET VALUE |
|---|---|
| DESTINATION RPR-MAC ADDRESS | FF-FF-FF-FF-FF-FF |
| SOURCE RPR-MAC ADDRESS | 00-E0-00-00-22-04 |
| DESTINATION MAC ADDRESS | FF-FF-FF-FF-FF-FF |
| SOURCE MAC ADDRESS | 00-E0-00-00-33-01 |
| TYPE/LENGTH | 0x0806 (ARP) |

FIG. 21

MAC ADDRESS LEARNING TABLE
(RPR DEVICES 5, 6)                    20A

RETRIEVE WITH USER DEVICE MAC ADDRESS →

| USER DEVICE MAC ADDRESS | RPR DEVICE MAC ADDRESS |
|---|---|
| 00-E0-00-00-33-01 | 00-E0-00-00-22-04 |
| ⋮ | |

FIG. 22

| DESTINATION MAC ADDRESS |
|---|
| SOURCE MAC ADDRESS |
| TYPE/LENGTH |
| DATA |
| FCS |

ARP RESPONSE PACKET

FIG. 23

INFORMATION FOR SETTING ARP RESPONSE PACKET

| FIELD NAME | SET VALUE |
|---|---|
| DESTINATION MAC ADDRESS | 00-E0-00-00-33-01 |
| SOURCE MAC ADDRESS | 00-E0-00-00-11-05 |
| TYPE/LENGTH | 0x0806 (ARP) |

RPR DATA PACKET (ARP RESPONSE)

INFORMATION FOR SETTING RPR DATA PACKET (ARP RESPONSE)

| FIELD NAME | SET VALUE |
|---|---|
| DESTINATION RPR-MAC ADDRESS | 00-E0-00-00-22-04 |
| SOURCE RPR-MAC ADDRESS | 00-E0-00-00-22-06 |
| DESTINATION MAC ADDRESS | 00-E0-00-00-33-01 |
| SOURCE MAC ADDRESS | 00-E0-00-00-11-05 |
| TYPE/LENGTH | 0x0806 (ARP) |

FIG. 28

RPR-MAC ADDRESS LEARNING TABLE AFTER UPDATING
(RPR DEVICE 5)

20A

| USER DEVICE MAC ADDRESS | RPR DEVICE MAC ADDRESS |
|---|---|
| 00-E0-00-00-33-01 | 00-E0-00-00-22-04 |
| 00-E0-00-00-11-05 | 00-E0-00-00-22-06 |
| ⋮ | ⋮ |

RETRIEVE WITH USER DEVICE MAC ADDRESS

FIG. 29

RPR-MAC ADDRESS LEARNING TABLE
(RPR DEVICE 4)

20A

| USER DEVICE MAC ADDRESS | RPR DEVICE MAC ADDRESS |
|---|---|
| 00-E0-00-00-11-05 | 00-E0-00-00-22-06 |
| ⋮ | ⋮ |

RETRIEVE WITH USER DEVICE MAC ADDRESS

NETWORK CONFIGURATION EXAMPLE
(WHEN L2 GROUPING IDENTIFIER IS USED)

FIG. 33

ARP REQUEST PACKET
(WHEN L2 GROUPING IDENTIFIER IS USED)

| |
|---|
| DESTINATION MAC ADDRESS |
| SOURCE MAC ADDRESS |
| TPID |
| PRIORITY |
| CF1 |
| VLAN ID |
| TYPE/LENGTH |
| DATA |
| FCS |

FIG. 34

INFORMATION FOR SETTING ARP DATA PACKET
(WHEN L2 GROUPING IDENTIFIER IS USED)

| FIELD NAME | SET VALUE |
|---|---|
| DESTINATION MAC ADDRESS | FF-FF-FF-FF-FF-FF |
| SOURCE MAC ADDRESS | 00-E0-00-00-33-01 |
| TYPE/LENGTH | 0x0806 (ARP) |
| TPID | 0x8100 |
| PRIORITY | 0 |
| CF1 | 1 |
| VLAN ID | 1 |

FIG. 35

RPR DATA PACKET (WHEN L2 GROUPING IDENTIFIER IS USED)

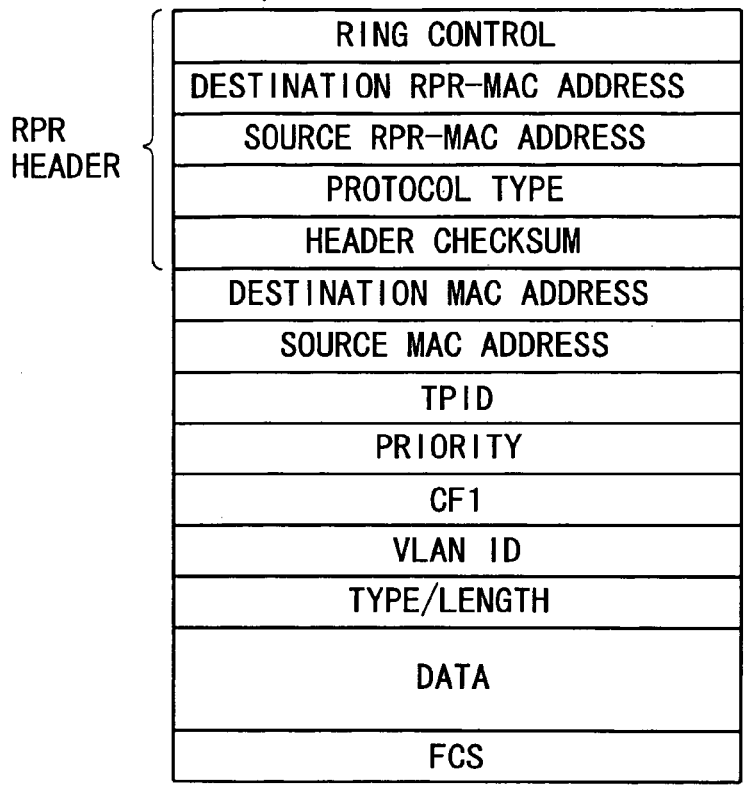

| RPR HEADER | RING CONTROL |
| | DESTINATION RPR-MAC ADDRESS |
| | SOURCE RPR-MAC ADDRESS |
| | PROTOCOL TYPE |
| | HEADER CHECKSUM |

Followed by:
- DESTINATION MAC ADDRESS
- SOURCE MAC ADDRESS
- TPID
- PRIORITY
- CF1
- VLAN ID
- TYPE/LENGTH
- DATA
- FCS

FIG. 36

INFORMATION FOR SETTING RPR DATA PACKET (WHEN L2 GROUPING IDENTIFIER IS USED)

| FIELD NAME | SET VALUE |
| --- | --- |
| DESTINATION RPR-MAC ADDRESS | FF-FF-FF-FF-FF-FF |
| SOURCE RPR-MAC ADDRESS | 00-E0-00-00-22-04 |
| DESTINATION MAC ADDRESS | FF-FF-FF-FF-FF-FF |
| SOURCE MAC ADDRESS | 00-E0-00-00-33-01 |
| TYPE/LENGTH | 0x0806 (ARP) |
| TPID | 0x8100 |
| PRIORITY | 0 |
| CF1 | 1 |
| VLAN ID | 1 |

RESILIENT PACKET RING DEVICE

CROSS REFERENCE TO RELATED APPLICATIONS

This is a continuing application, filed under 35 U.S.C. §111(a), of International Application PCT/JP03/01442, filed Feb. 12, 2003.

BACKGROUND OF THE INVENTION

1. Field of the Invention

The present invention relates to an RPR (Resilient Packet Ring) network constituted in such a way that a plurality of RPR devices are connected to one or more rings, and more particularly to a packet transfer method using an RPR technique that uses an L2-RPR mapping table in a layer 2 (L2, namely datalink layer in OSI reference model)

2. Description of the Related Art

Conventionally, in a connection between remote hosts, network construction using a private line was a typical method. However, in the network establishment using the private line, in an end-to-end communication, the following problems occur.

(1) This results in the occupation of all bandwidths.
(2) A price is set high in various services such as private line IP (Internet Protocol) connection and the like.

Also, because of its system in which the price of services are determined on the basis of a connection distance of the private line, the construction of a national network based on the private line requires a large amount of money.

To that end, in order to solve the problems of the network establishment based on the private line, the technique proposed under the assumption that the LAN (Local Area Network) technique used on the user's side is used to establish all networks is a wide area LAN service.

The wide area LAN service is such that a method used in the LAN, namely, the Ethernet (registered treadmark) used in the network, in which computers at positions relatively close to each other are connected, is expanded and applied to a large-scale wide area network service (see FIG. 37).

The user takes a merit that since all hosts seem to be simply connected through the LAN, it is very easy to use, and an apparatus cost and a maintenance cost are low. Due to those facts, the wide area LAN service is wide-spreading now.

In the current wide area LAN service, a connection point to the user can be attained through a cheap LAN interface. However, the interface inside a carrier network is attained (realized) by mapping a frame of the Ethernet (IEEE 802.3) to a SONET (Synchronous Optical Network)/SDH (Synchronous Digital Hierarchy) technique having a high reliability. This SONET/SDH neither occuping the bandwidth nor obtain a statistic multiplex effect. For this reason, the usage fee of the SONET/SDH is very high for the user.

In such situation, the RPR technique appears as a technique replacing the expensive SONET/SDH communication portion. The RPR uses a packet ring (ringlet) accessing method, which enables data communication with the bandwidth from the minimum level of 155 Mbps to the maximum level of 10 Gbps. Also, since the RPR supports a double ring circulating in two opposite directions referred to as an outer ring and an inner ring, this is superior even in recoverability through trouble recovering means.

Moreover, in the RPR, while the merit of the packet communication is used to exhibit the statistic multiplex effect, similarly to the SONET/SDH, the bandwidth guarantee similar to a hard wired private line is established. Also, a data packet can be transmitted to both of the outer ring and the inner ring.

A transmission node has a function of transmitting data by selecting the side, which enables the shortest route, by using a topology detection technique when the data packet is transmitted. In this function, an RPR header is added to the transmission data packet at an inlet to the ring, and the RPR header is removed at an outlet from the ring.

Under the current situation, by installing the RPR function in a router having the L3 (layer 3, namely, network layer in OSI reference model) function such as a routing protocol or the like, the RPR device (node) is configured, and such an RPR device is used to establish the RPR ring network. That is, the RPR ring network under the current situation is attained with the L3 function given thereto. FIG. 38 is a principle explanatory view of the conventional RPR device.

The RPR device has interfaces for dropping in and dropping out from/to the outer ring and the inner ring and also has a plurality of user device interfaces.

Also, the RPR device includes: a transmission ring selector for selecting a transmission destination of a frame from the outer ring and the inner ring; a transmission RPR device judgment unit for judging an RPR device as the transmission destination of the frame; a reception user data judgment unit for analyzing the user data received from the user device interfaces; a user address learning unit for registering the correspondence between a user device address and its inclusioin (accommodated) position in a user device address/accommodation position learning table; a reception data judgment unit for analyzing the frame received from the RPR ring; a transmission position judgment unit for judging a transmission position of the frame to the user device; a user address retrieving unit for referring to the user device address/accommodation position learning table and retrieving an accommodation position corresponding to the user address; and an IP routing controller for carrying out routing of an L3 level to the received frame and a route selection.

In the RPR ring network under the current situation, the operation of the RPR device when a data transfer is executed from a terminal A to a terminal B is explained in brief with reference to FIG. 39. Respective numerals in the parenthesis in FIG. 39 related to the following outline correspond to numerals as below.

(1) A maintenance person carries out initial settings of RPR devices I to IV constituting the ring.

(2) Each of the RPR devices I to IV executes the ring topology detection and creates a topology map (the RPR device I collects the information on the node and the number of hops on the ring.

(3) Each RPR device and each router create the routing table in accordance with the routing protocol.

(4) The terminal A transmits an ARP (Address Resolution Protocol) request into a subnet to which the terminal A itself belongs (in order that the terminal A knows a MAC (Media Access Control) address of a router X).

(5) The router X transfers an ARP response to the terminal A (the terminal A recognizes a destination MAC address).

(6) The terminal A transmits a packet addressed to the terminal B to the router X (DA (Destination Address): the MAC address of the router X, SA (Source Address): the MAC address of the terminal A).

(7) The router X extracts the destination IP address from the reception packet and recognizes that the terminal B exists forward of the RPR device I, from the routing table created on the basis of the L3 routing protocol. Thus, the ARP request is sent into the subnet on the RPR device I side (in order that the router X knows the MAC address of the RPR device I).

(8) The RPR device I recognizes that the router X exists under the administration of a port "a" of the RPR device I itself (the RPR device I creates a MAC learning table (the user device address/accommodation position learning table)).

(9) The RPR device I transmits the ARP response to the router X (the router X recognizes the destination MAC address (the MAC address of the RPR device I)).

(10) The router X transmits the packet to the RPR device I (DA: the MAC address of the RPR device I, SA: the MAC address of the router X).

(11) The RPR device I extracts the destination IP address from the packet received in the step (10) and recognizes that the terminal B exists forward of the RPR device III, from the routing table. Thus, an RPR header (DA: the MAC address of the RPR device III, SA: the MAC address of the RPR device I) is added to the reception packet, and it is transmitted into the RPR ring.

(12) The RPR device II passes the packet therethrough because the packet destination is not the RPR device II, and the RPR device III drops the packet.

(13) The RPR device III transmits the ARP request into the subnet to which the terminal B belongs (in order that the RPR device III knows the MAC address of the terminal B).

(14) The terminal B transmits the ARP response to the RPR device III (the RPR device III recognizes the destination MAC address (the MAC address of the terminal B)).

(15) The RPR device III removes the RPR header of the received packet and transmits it to the terminal B (DA: the MAC address of the terminal B, SA: the MAC address of the RPR device III).

Incidentally, Luminous Networks Inc. provides a ring transmission technique "Resilient Packet Transport" (RPT) that can establish the ring type network such as the SONET/SDH by using the L2 technique. This technique is attained by using an encapsulation control based on a special frame format.

Also, as the technique provided originally prior to the standardization of IEEE802.17 as a different technique from the RPT, there are SRP (Spatial Reuse Protocol) of Cisco Systems Inc. and OPTera PacketEdge of Nortel Corporation. However, both the SRP and the OPTera PacketEdge are based on the control method with the L3 function given thereto.

Note that, as the prior art document related to the present application, there are the inventions noted in Patent Documents 1 and 2 below. Patent Document 1 discloses the technique for generating VPN (Virtual Private Network) on a shared network and creating an L2 routing table by mapping VLAN (Virtual Local Area Network) and MPLS (Multi-Protocol Label Switching) header in a network in which a communication is carried out inside the VPN.

Patent Document 2 discloses the technique for carrying out the packet transmission inside the ring without using capsule and token, by creating a table to carry out self-learning with respect to one or both of a ring side port and a local side port, in the network of the ring configuration.

[Patent Document 1]
JP 2002-164937 A
[Patent Document 2]
JP 2002-523992 A

The above-mentioned conventional RPR control method has the following problems (subjects). Firstly, in the current situation, the RPR function is installed in the router having the L3 (layer 3) functions such as the routing protocol so that the RPR device is configured, and such the RPR device is used to establish the ring network.

For this reason, required are a high performance CPU (Central Processing Unit) and high functional software and hardware. Also, the routing protocol requires a large-capacity memory. Those requirements cause the higher cost of the entire RPR device (node).

Secondly, since the RPR device is equipped with the L3 function, the expensive maintenance cost is required to operate/manage the complex function.

Thirdly, the method of realizing the objective one with the L2 function in the existing technique is attained by encapsulating the header by using the unique header and the like, such as Luminous Networks Inc. Thus, it could not be directly connected to the RPR device.

SUMMARY OF THE INVENTION

An object of the present invention is to provide the RPR device that can establish an RPR ring network without an L3 function.

Also, another object of the present invention is to provide an RPR device that can reduce a cost of the entire device.

Also, another object of the present invention is to provide an RPR device that can reduce a maintenance cost.

Also, another object of the present invention is to provide an RPR device that can attain data transmission in the RPR ring network without using a special data format.

According to a first aspect of the present invention, there is provided an RPR device, which is connected to one or more rings to constitute an RPR (Resilient Packet Ring) network, including:

a storage unit storing a correspondence between an RPR device address, each indicating each RPR device connected to the one or more rings and a user device address, each indicating a user device respectively accommodated in the RPR device;

a transfer control unit that receives a data addressed to a predetermined user device which is received from a user device accommodated in the RPR device itself, and when an RPR device address of an RPR device accommodating the predetermined user device is registered in the storage unit, adds an RPR header, in which the RPR device address is set as a destination RPR device address, to the data; and a unit transmitting the data, to which the RPR header is added, to the RPR device network.

The RPR device according to the first aspect of the present invention preferably further includes:

a receiving unit receiving the data with the RPR header from the RPR network; and a address learning unit that receives at least a transmission source address of the data to which the RPR header and a transmission source RPR device address set for the RPR header from the receiving unit, and when the transmission source address is not registered in the storage unit, registers a correspondence between the transmission source address and the transmission source RPR device address in the storage unit.

According to the first aspect of the present invention, preferably, the address learning unit includes:

a judgment unit for judging whether or not the transmission source address of the data with the RPR header received by the receiving unit is stored in the storage unit; and a registration unit that, when the transmission source address is not stored, registers a correspondence between the transmission source address and the transmission source RPR device address set for the packet with the RPR header.

According to the first aspect of the present invention, preferably, the transfer control unit includes:

a retrieving unit that uses a transmission destination address of the data addressed to the predetermined user device as a retrieval key and retrieves a corresponding RPR device address; and an adding unit that, when the corresponding RPR device address is retrieved, adds the RPR header, in which the RPR device address is set as the destination RPR device address, to the data.

According to the first aspect of the present invention, preferably, the receiving unit does not pass at least the transmission source address of the data and the transmission source RPR device address set for the RPR header to the address learning means, when a group identifier set for the data to which the RPR header is added and which is received from the RPR network is not coincident with a group identifier to which the user device accommodated in the RPR device itself belongs.

According to the first aspect of the present invention, preferably, the user device address and the RPR device address are MAC addresses. The group identifier is preferably a layer 2 grouping identifier (e.g., VLAN ID).

According to a second aspect of the present invention, there is provided an RPR network system, including: a plurality of RPR devices including first and second RPR (Resilient Packet Ring) devices each accommodating one or more user devices; and one or more rings to which the RPR devices are connected, in which:

the first RPR device, when receiving a broadcast packet requiring (desiring) an arrival at a second user device included in the second RPR device, from a first user device accommodated in the RPR device itself, adds an RPR header, in which a transmission source address is an address of the first RPR device and a destination RPR device address is a broadcast address, to the packet to be transmitted to an RPR network;

the second RPR device, when receiving the packet, to which the RPR header is added and which is transmitted from the first RPR device, from the RPR network, in accordance with the transmission source address of the RPR header and the MAC address of the first user device set as the transmission source address for the packet, learns that the first RPR device includes the first user device, removes the RPR header from the packet, and transmits the packet to the second user device;

the second RPR device, when receiving the packet addressed to the first user device and transmitted from the second user device, adds the RPR header, in which the MAC address of the first RPR device that has been already learned is set as the destination RPR device address, to the packet to be transmitted to the RPR network; and the first RPR device, when receiving the packet, to which the RPR header is added and which is transmitted from the second RPR device, from the RPR network, removes the RPR header from the packet to be transmitted to the first user device.

According to the second aspect of the present invention, preferably, the first RPR device, when receiving the packet to which the RPR header is added and which is transmitted from the second RPR device, in accordance with the RPR device address of the second RPR device set as the transmission source RPR device address for the RPR header, and the address of the second user device set as the transmission source address of the packet, learns that the second RPR device accommodates the second user device, and when receiving the packet in which the address of the second user device is set as the destination address from the first user device, adds the RPR header, in which the RPR device address of the second RPR device that has been already learned is set as the destination RPR device address, to the packet to be transmitted to the RPR network.

According to the second aspect of the present invention, preferably, the RPR device for relaying the packet to which the RPR header is added and which is transferred between the first RPR device and the second RPR device, when receiving the packet to which the RPR header is added and which is transmitted from the first or second RPR device, in accordance with the transmission source RPR device address set for the packet to which the RPR header is added, and the transmission source address, learns that the user device specified on the basis of the transmission source address is included in the RPR device specified on the basis of the transmission source RPR device address.

According to the second aspect of the present invention, preferably, a layer 2 grouping identifier indicating a layer 2 group to which the user devices included in different RPR devices belong is set for the packet that is transmitted and received between the user devices; and each of the plurality of RPR devices holds the layer 2 grouping identifier of the user devices included in its own device, and when an layer 2 grouping identifier different from the layer 2 grouping identifier held by its own device is set for the packet to which the RPR header received from the RPR network is added, does not capture of the packet to which the RPR header is added and carry out the learning.

According to a third aspect of the present invention, there is provided a data transfer method for an RPR device that is connected to one or more rings and constitutes an RPR (Resilient Packet Ring) network, the method including:

receiving a data addressed to a predetermined user device, which is received from a user device accommodated in the RPR device itself;

when an RPR device address of the RPR device accommodating the predetermined user device is registered in a storage unit for registering a correspondence between an RPR device address, each indicating each RPR device connected to the one or more rings, and user device addresses, each indicating a user device accommodated in each RPR device, adding the RPR header in which the RPR device address is set as the destination RPR device address, to the data; and transmitting the data, to which the RPR header is added, to the RPR network.

The data transfer method for an RPR device according to the third aspect of the present invention preferably further includes:

receiving the data, to which the RPR header is added, from the RPR network; and when the transmission source address of the received data is not registered in the storage unit, correlating the transmission source address and the transmission source RPR device address to be registered in the storage unit.

The data transfer method for an RPR device according to the third aspect of the present invention preferably further includes:

judging whether or not the transmission source address of the data to which the RPR header is added and which is received from the RPR network is stored in the storage unit; and when the transmission source address is not stored, correlating the transmission source address and the transmission source RPR device address set for the RPR header to be registered in the storage unit.

The data transfer method for an RPR device according to the third aspect of the present invention preferably further includes;

retrieving an equivalent RPR device address by using a transmission destination address of the data destinated to the predetermined user device as a retrieval key; and when the equivalent RPR device address is retrieved, adding the RPR header, in which the RPR device address is set as the destination RPR device address, to the data.

According to the third aspect of the present invention, preferably, when a group identifier set for the data to which the RPR header is added and which is received from the RPR network is not coincident with a group identifier assigned to the user device included in its own device, a registration process for the transmission source address of the data and the transmission source RPR device address set for the RPR header in the storage unit is not performed.

According to the third aspect of the present invention, preferably, the user device address and the RPR device address are MAC addresses, and the group identifier is a layer 2 grouping identifier, and the layer 2 grouping identifier is a VLAN ID.

According to a fourth aspect of the present invention, there is provided a data transfer method for an RPR network system, in which a plurality of RPR devices including first and second RPR (Resilient Packet Ring) devices accommodating one or more user devices are connected, the method including:

when the first RPR device receives a packet of a broadcast specification requesting an arrival at a second user device included in the second RPR device from a first user device included in the first RPR device, adding, with the first RPR device an RPR header, in which a transmission source address is a MAC address of the first RPR device and a destination address is a broadcast address, to the packet to be transmitted to an RPR network;

when the second RPR device receives the packet, to which the RPR header is added and which is transmitted from the first RPR device, from the RPR network, in accordance with the transmission source address of the RPR header and an address of the first user device set as the transmission source address for the packet, learning, with the second RPR device, that the first RPR device includes the first user device and removing the RPR header from the packet to be transmitted to the second user device;

when the second RPR device receives the packet destinated to the first user device and transmitted from the second user device, adding, with the second RPR device, the RPR header, in which the MAC address of the first RPR device that has been already learned is set as the destination RPR device address, to the packet to be transmitted to the RPR network; and when the first RPR device receives the packet, to which the RPR header is added and which is transmitted from the second RPR device, from the RPR network, removing, with the first RPR device the RPR header from the packet to be transmitted to the first user device.

The data transfer method for an RPR network system according to the fourth aspect of the present invention preferably further includes:

when the first RPR device receives the packet to which the RPR header is added and which is transmitted from the second RPR device, in accordance with the RPR device address of the second RPR device set as the transmission source RPR device address for the RPR header, and the address of the second user device set as the transmission source address of the packet, learning, with the first RPR device that the second RPR device includes the second user device; and when the first RPR device receives the packet in which the address of the second user device as a destination address is set as the destination address from the first user device, adding, with the first RPR device the RPR header, in which the RPR device address of the second RPR device that has been already learned is set as the destination RPR device address, to the packet to be transmitted to the RPR network.

The data transfer method for an RPR network system according to the fourth aspect of the present invention preferably further includes, when the RPR device for relaying the packet to which the RPR header is added and which is transferred between the first RPR device and the second RPR device, receives the packet to which the RPR header is added and which is transmitted from the first or second RPR device, in accordance with the transmission source RPR device address set for the packet to which the RPR header is added, and the transmission source address, learning with the RPR device, that the user device specified on the basis of the transmission source address is included in the RPR device specified on the basis of the transmission source RPR device address.

According to the fourth aspect of the present invention, preferably, a layer 2 grouping identifier indicating a layer 2 group to which the user devices included in different RPR devices belong is set for the packet that is transmitted and received between the user devices, and each of the plurality of RPR devices holds the L2 grouping identifier of the user devices included in its own device, and when an L2 grouping identifier different from the L2 grouping identifier held by its own device is set for the packet to which the RPR header is added and which is received from the RPR network, does not capture the packet to which the RPR header is added and carry out the learning.

BRIEF DESCRIPTION OF THE DRAWINGS

FIG. 12 is a format explanatory view of an ARP request packet according to the embodiment;
FIG. 13 is an explanatory view of the set information of the ARP request packet shown in FIG. 12;
FIG. 14 is a view showing a MAC address learning table;

FIG. 21 is a view showing an RPR-MAC address learning table;

FIG. 22 is a format explaining view of an ARP response packet according to the embodiment;

FIG. 23 is an explaining view of the set information of the ARP response packet shown in FIG. 22;

FIG. 28 is a view showing the RPR-MAC address learning table after update;

FIG. 29 is a view showing the RPR-MAC address learning table;

FIG. 33 is a format explaining view of an ARP request packet (when the L2 grouping identifier is used) according to the embodiment;

FIG. 34 is an explaining view of the set information of the ARP request packet (when the L2 grouping identifier is used) shown in FIG. 33;

FIG. 35 is a format explaining view of an RPR data packet (when the L2 grouping identifier is used) according to the embodiment;

FIG. 36 is an explaining view of the set information of the RPR data packet (when the L2 grouping identifier is used) shown in FIG. 35;

DESCRIPTION OF THE PREFERRED EMBODIMENT OF THE INVENTION

Embodiment of the present invention will be described below. The following embodiment is given by way of example, and the present invention is not limited to configuration of the embodiment.

[Principle of the Invention]

Figure 1:
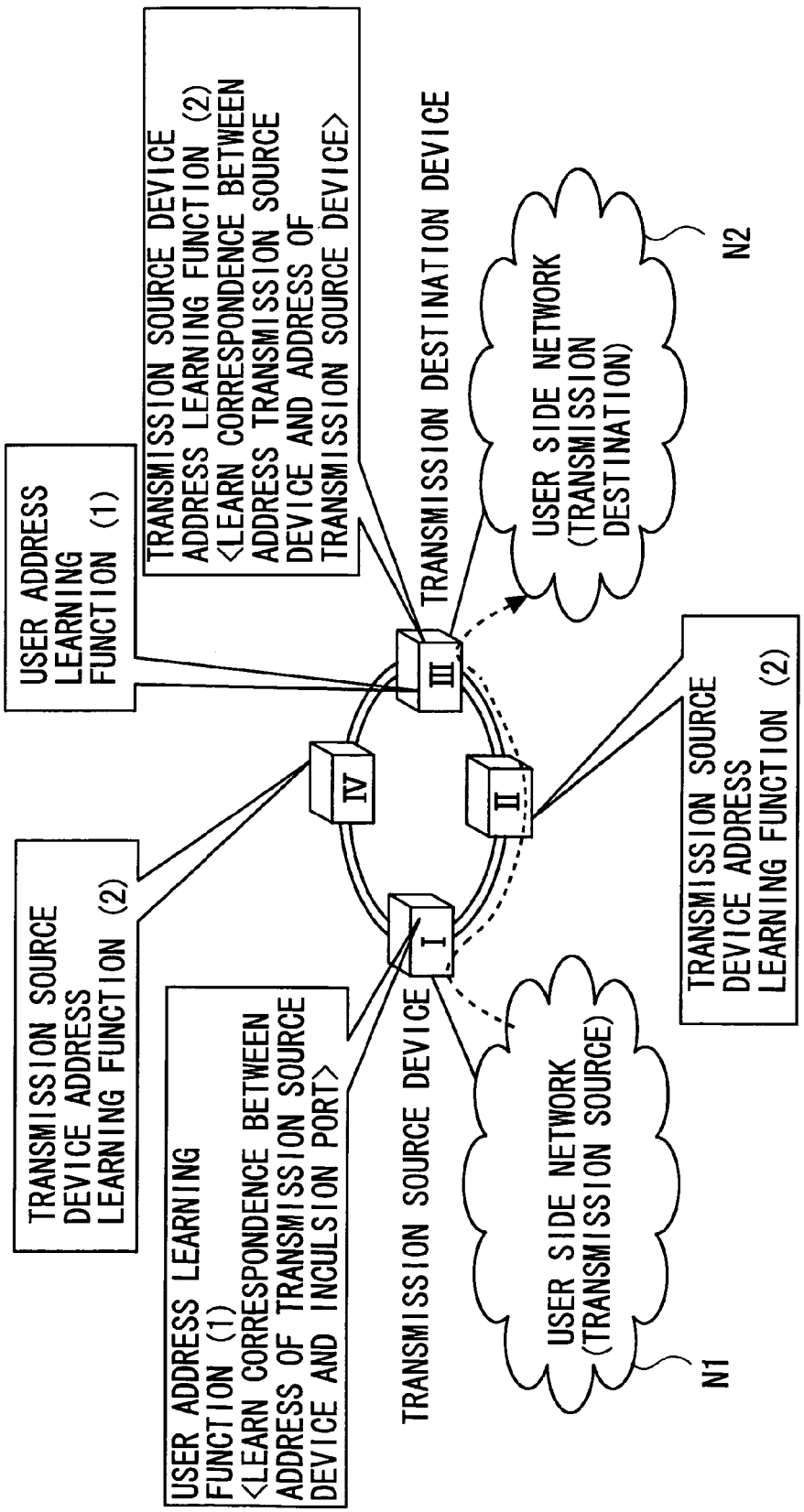
FIG. 1 is a principle view of the present invention.
Figure 2:
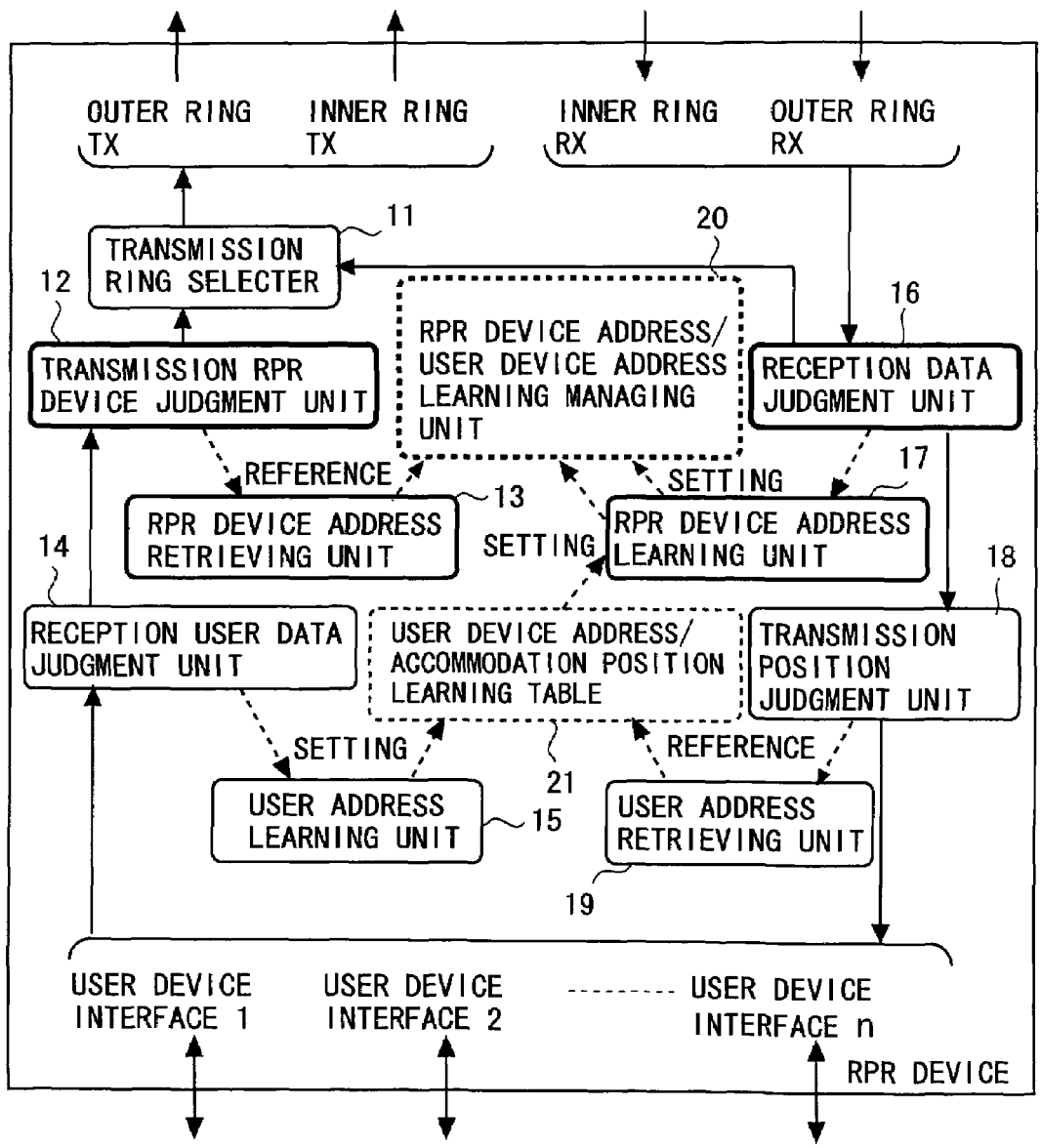
FIG. 2 is a principle view of the present invention.
Figure 3:
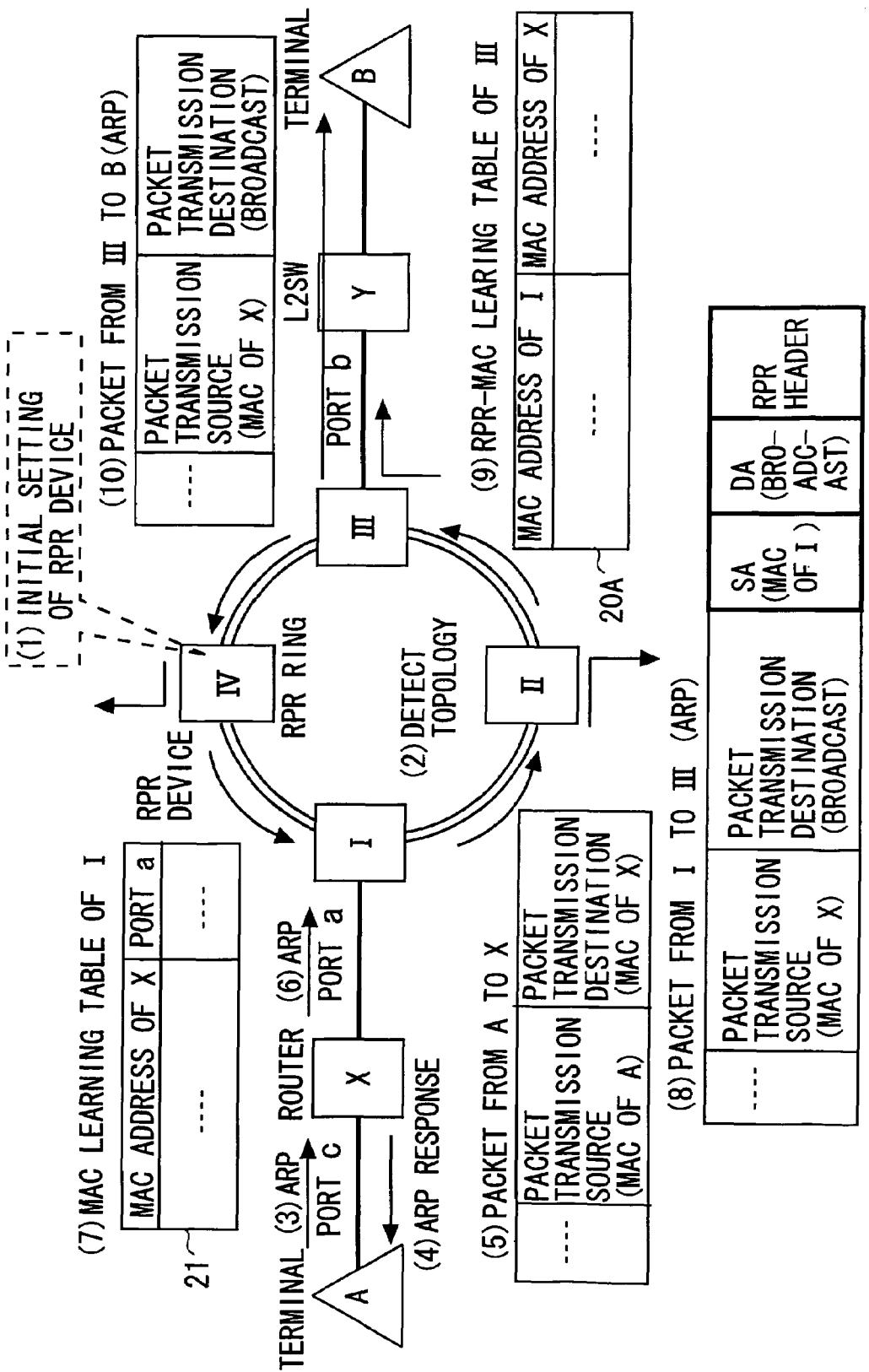
FIG. 3 is an operation explanatory view of the present invention.
Figure 4:
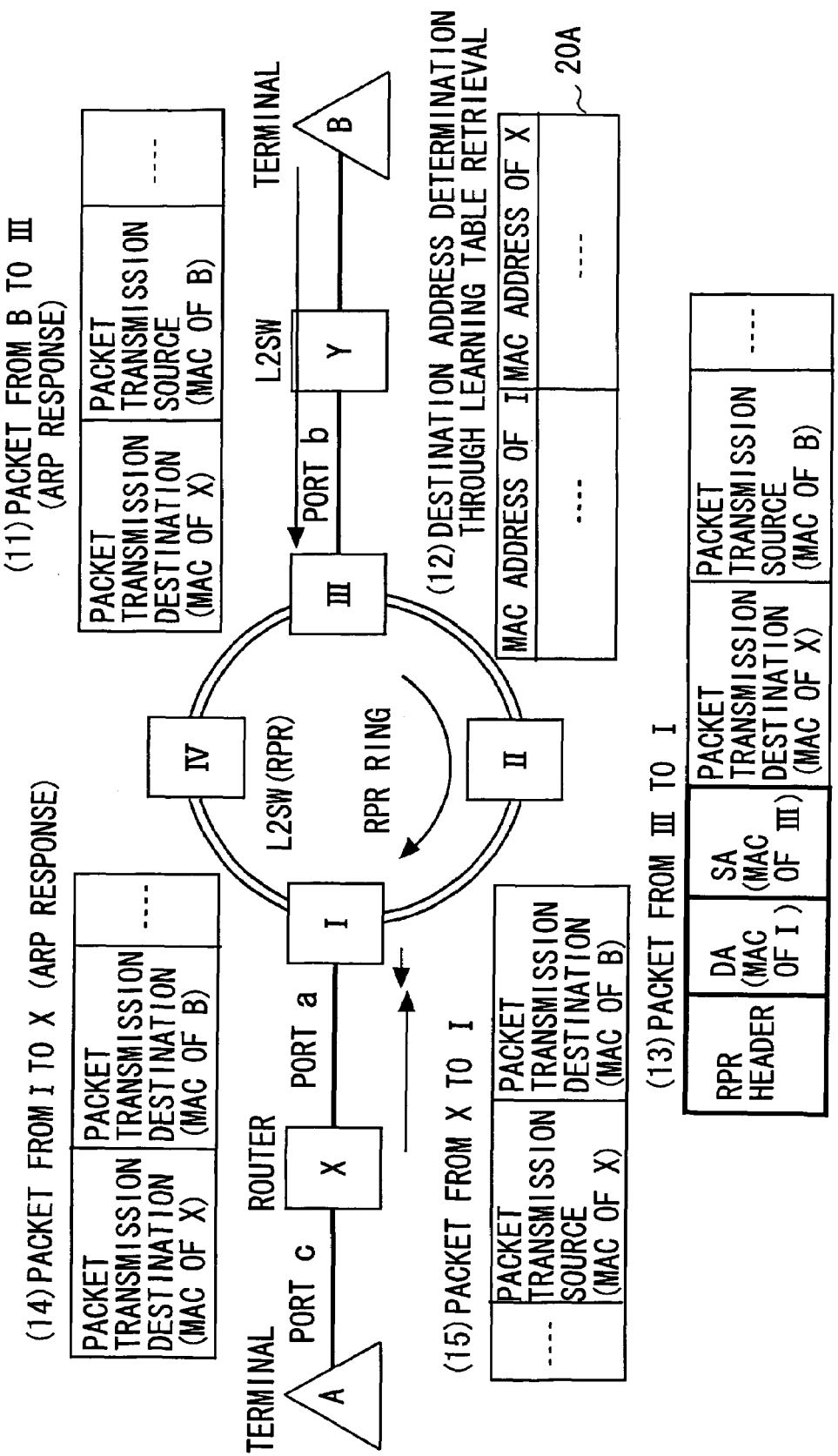
FIG. 4 is an operation explanatory view of the present invention.
Figure 5:
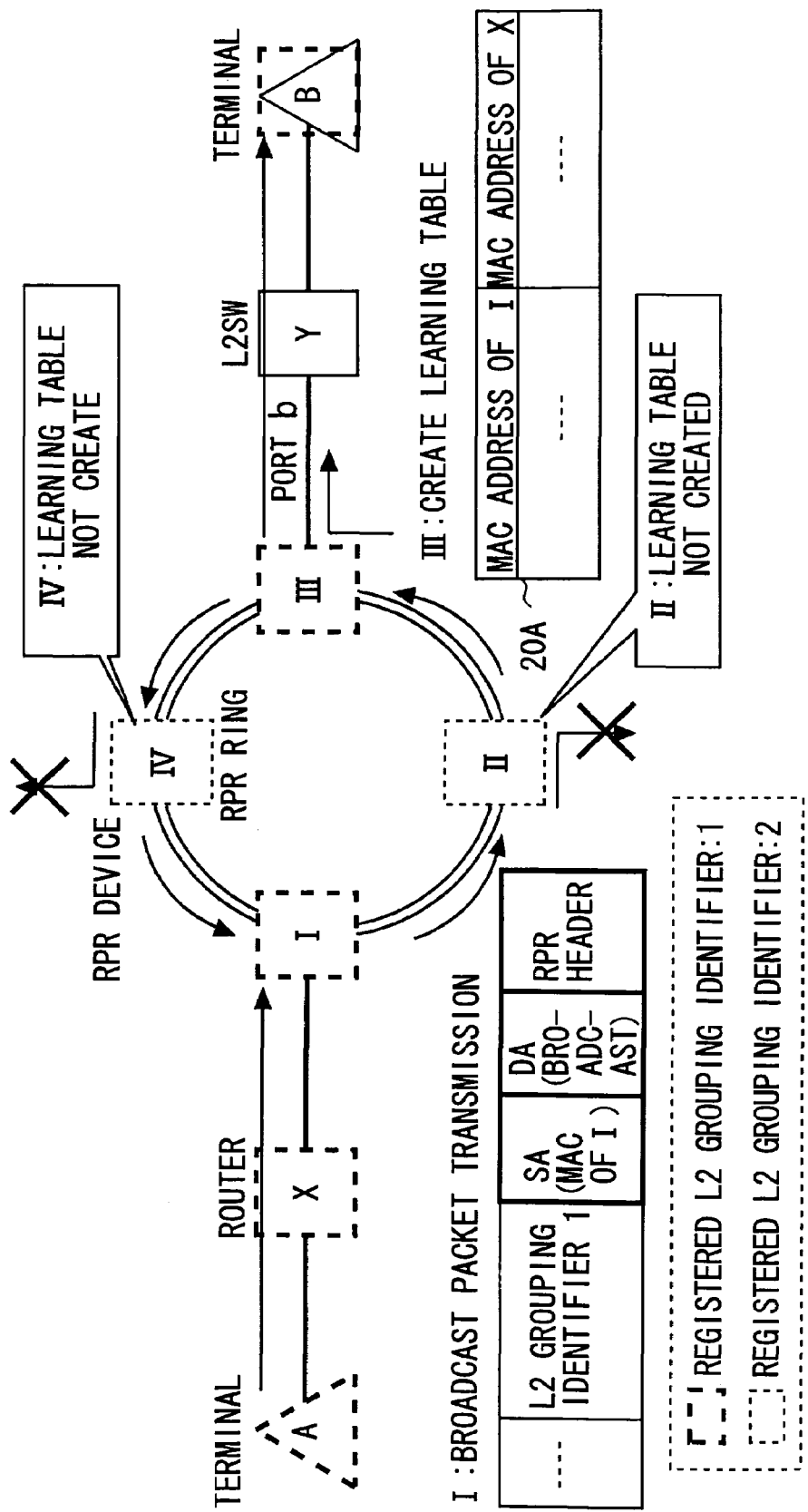
FIG. 5 is an operation explanatory view of the present invention.

At first, the principle in the present invention is explained. FIG. 1 is a view showing a configuration example of a network system according to the present invention, FIG. 2 is a view of a configuration example of an RPR device according to the present invention, and FIGS. 3, 4 and 5 are operation explanatory views of the network system and RPR device shown in FIGS. 1 and 2, respectively.

<Network Configuration Example>

FIG. 1 illustrates a plurality of RPR devices I, II, III, and IV according to the present invention. The RPR devices I, II, III, and IV are connected to RPR rings (inner and outer rings) Consequently, an RPR ring network is established.

The RPR devices I and III include user side networks N1, N2, respectively. The RPR ring network is used as a backbone to transfer data from the network N1 to the network N2.

The RPR device I functions as a transmission source device of data in the RPR ring network, when the data is transferred to the network N2 from the network N1. Also, the RPR device I has a user address learning function for learning the correspondence between an address (a node address of the RPR device I) of a transmission source device and an accommodation port of the network N1.

Also, the RPR device III functions as a transmission destination device of the data in the RPR ring network, when the data is transferred to the network N2 from the network N1.

Also, the RPR device III has a user address learning function (1) for learning the correspondence between an address (a node address of the RPR device III) of a transmission destination device and an accommodation port of the network N2.

Moreover, each of the RPR devices I, II, III and IV has a transmission source device address learning function (2) for learning an address of a transmission source device of the data in the RPR ring network from the data transferred within the RPR ring network.

<Configuration Example of RPR Device>

FIG. 2 shows the configuration example of each of the RPR devices I, II, III and IV. As shown in FIG. 2, the RPR device according to the present invention includes: interfaces to carry out drop-in and drop-out of frames to the RPR rings; and a plurality of user device interfaces to accommodate user devices in a user side network.

Moreover, the RPR device includes: transmission ring selector 11 connected to the interfaces on the out (transmitting) side to the RPR rings; a transmission RPR device judgment unit 12 connected to the transmission ring selector 11; an RPR device address retrieving unit 13 controlled by the transmission RPR device judgment unit 12; a reception user data judgment unit 14 connected to the transmission RPR device judgment unit 12; and a user address learning unit 15 controlled by the reception user data judgment unit 14.

Moreover, the RPR device includes a reception data judgment unit 16 connected to the interfaces on the in (receiving) side to the RPR rings; an RPR device address learning unit 17 controlled by the reception data judgment unit 16; a transmission position judgment unit 18 connected to the reception data judgment unit 16; a user address retrieving unit 19 controlled by the transmission position judge unit 18; an RPR device address/user device address learning managing unit 20 referred to by the RPR device address learning unit 13 and set by the RPR device address learning unit 17; and a user device address/accommodation position learning table 21 which is set by the user address learning unit 15 and referred to by the user address retrieving unit 19.

The transmission ring selector 11 receives packets, each of which an RPR header is added, from the transmission RPR device judgment unit 12 and the reception data judgment unit 16. The transmission ring selector 11, when receiving the packet, confirms the RPR header of the packet, selects one of the inner ring and the outer ring to which the packet (frame) is transmitted, and transmits the packet to the selected ring.

The transmission RPR device judgment unit 12 judges a MAC address of a transmission destination RPR device from a destination MAC address of the packet, and adds the RPR header based on the judgment result to the packet.

That is, the transmission RPR device judgment unit 12, when receiving the packet, instructs the RPR device address retrieving unit 13 to retrieve a transmission destination RPR device address corresponding to the destination MAC address of this packet, and if receiving the transmission destination RPR device address as the retrieval result, adds the RPR header including this transmission destination RPR address to the packet and gives to the transmission ring selector 11.

The RPR device address retrieving unit 13 retrieves the MAC address of the RPR device, to which the transmission destination user device is connected with the destination MAC address of the packet, from the RPR device address/user device address learning managing unit 20.

That is, the RPR device address retrieving unit 13 retrieves the transmission destination RPR device address corresponding to the destination MAC address of the packet from the RPR device address/user device address learning managing unit 20, in accordance with the instruction from the transmission RPR device judgment unit 12. If it can obtain the corresponding transmission destination RPR device address, it notifies the transmission RPR device judgment unit 12 of this transmission destination RPR device address.

The reception user data judgment unit 14 judges an accommodation port of a transmission source user device and the MAC address of the transmission source user device, from the packet received from the user device, and gives to the user address learning unit 15.

That is, the reception user data judgment unit 14 receives the packet received by any of the user device interfaces (accommodation ports) and notifies the user address learning unit 15 of at least a port number of the accommodation port receiving this packet and the transmission source MAC address of the packet.

The user address learning unit 15 learns the accommodation port of the transmission source user device connected to its own RPR device and the MAC address of the transmission source user device. That is, the user address learning unit 15 correlates the port number of the accommodation port (reception port) of the transmission source user device of the packet received from the reception user data judgment unit 14 and the MAC address (transmission source MAC address of the packet) of the transmission source user device and sets for the user device address/accommodation position learning table 21.

The reception data judgment unit 16 judges the destination MAC address of the RPR header added to the packet received from the ring network (RPR ring) and determines whether the packet is transferred to the adjacent RPR device or taken (dropped) in its own RPR device.

That is, the reception data judgment unit 16, if the transmission destination RPR device address added to the packet is the self-RPR device address, transmits the packet to the transmission position judgment unit 18. On the contrary, if the transmission destination RPR device address is not the self-RPR device address, the packet is transmitted to the transmission ring selector 11. Also, the reception data judgment unit 16 gives the packet, to which the RPR header is added, to the RPR device address learning unit 17.

Also, the present invention can use the L2 grouping identifier (for example, a VLAN identifier). In this case, the reception data judgment unit 16 can be configured so as to further carry out filtering before judging the destination MAC address of the RPR header, in addition to the above-mentioned functions.

The RPR device address learning unit 17 learns the transmission source RPR device address and the user device address from the packet received from the reception data judgment unit 16.

That is, the RPR device address learning unit 17 learns the correspondence between the transmission source RPR device address of the RPR header added to the packet and the transmission source MAC address (transmission source user device address) of the packet, and sets for the RPR device address/user device address learning managing unit 20.

Also, the RPR device address learning unit 17 can refer to the user device address/accommodation port correspondence table 21 that is learned, and learn the address of the self-RPR device and the user device address under the administration of the RPR device itself, and also set for the RPR device address/user device address learning managing unit 20.

The transmission position judgement unit 18 receives the packet to which the RPR header is added, and removes the RPR header of this packet, and instructs the user address retrieving unit 19 to retrieve the port number corresponding to the destination MAC address of this packet, and if receiving the corresponding port number from the user address retrieving unit 19, transmits the packet from the accommodation port (user device interface) corresponding to this port number.

The user address retrieving unit 19 retrieves the accommodation port of the transmission destination user device corresponding to the destination MAC address of the packet from the user device address/accommodation position learning table 21, in accordance with the instruction from the transmission position judgment unit 18. If the corresponding accommodation port is found, this accommodation port (port number) is notified to the transmission position judgment unit 18.

The RPR device address/user device address learning managing unit 20 manages an RPR-MAC address learning table 20A (refer to FIG. 3) indicating the correspondence of the learned RPR device address/user device address.

Note that, when the present invention uses the L2 grouping identifier, the L2 grouping identifier can be configured so as to be managed in the RPR device address/user device address learning managing unit 20.

The user device address/accommodation position learning table 21 holds and manages a correspondence table (also referred to as "MAC Learning Table") indicating the correspondence between the user device address and the accommodation port of the user device.

Figure 38:
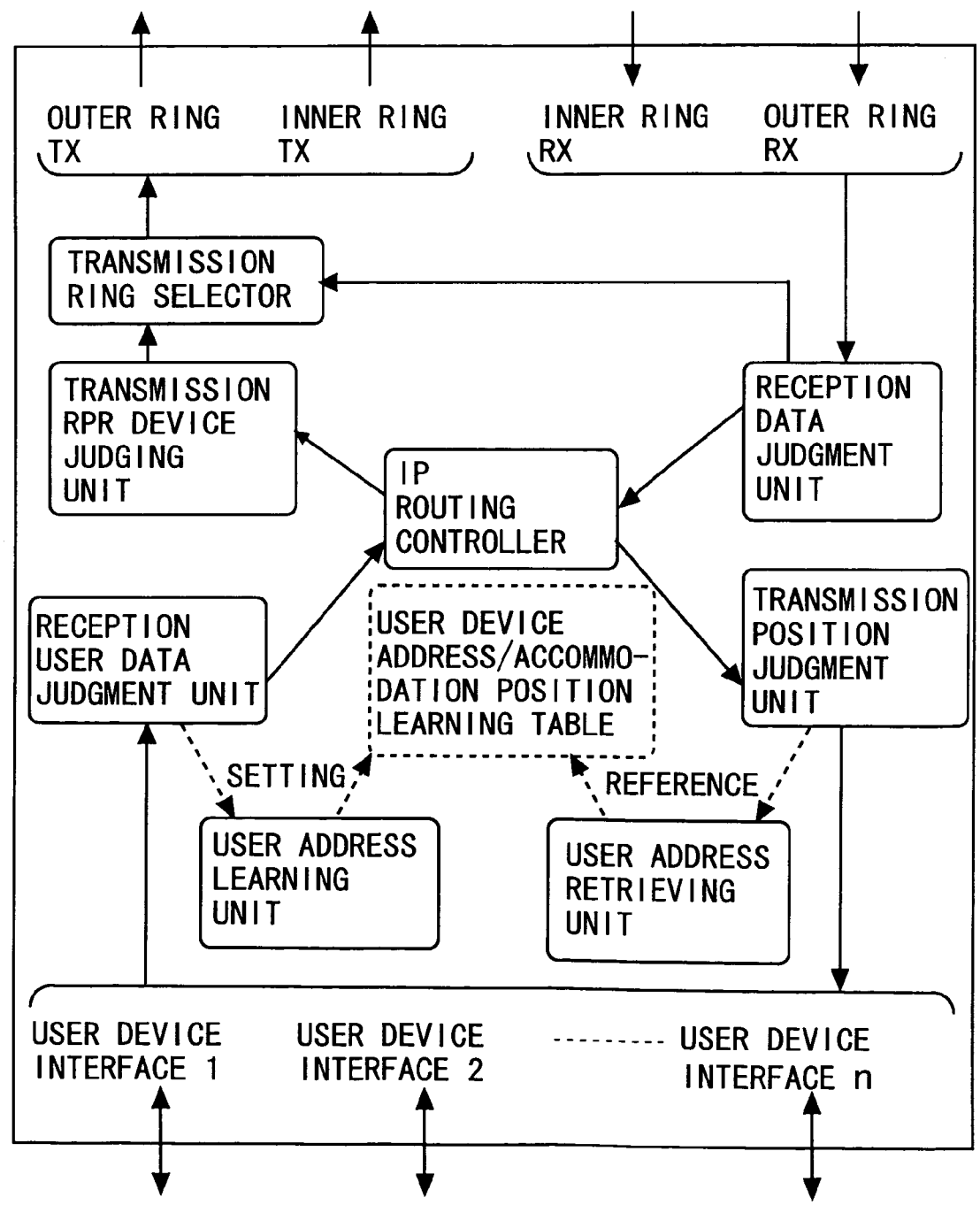
FIG. 38 is a principle view of a conventional RPR device.
Figure 39:
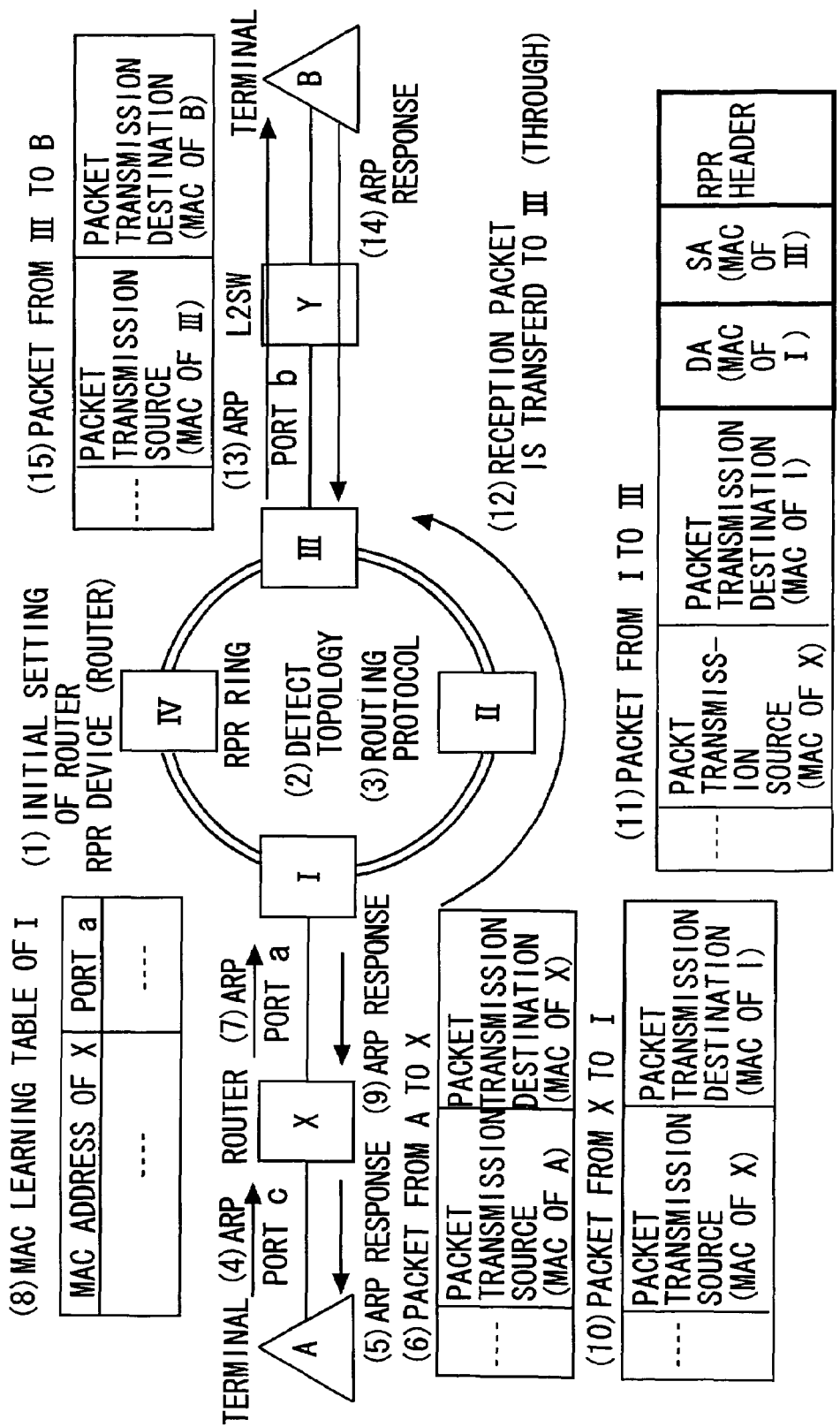
FIG. 39 is an explaining view of a conventional technique (an RPR control method in a router).

Note that, the configuration of the RPR device shown in FIG. 2 can be attained, for example, by adding the modification to the transmission RPR device judgment unit and reception data judgment unit of the conventional RPR device (FIG. 38) and also preparing the RPR device address retrieving unit 13, the RPR device address learning unit 17 and the RPR device address/user device address learning managing unit 20, instead of the IP routing controller.

In the configuration shown in FIG. 2, the RPR-MAC address learning table managed by the RPR device address/user device address learning managing unit 20 corresponds to a storage unit of the present invention.

Also, the transmission RPR device judgment unit 12 and the RPR device address retrieving unit 13 correspond to transfer controlling means of the present invention, the transmission RPR device judgment unit 12 corresponds to an adding unit of the present invention, and the RPR device address retrieving unit 13 corresponds to a retrieving unit of the present invention. Also, the transmission ring selector 11 corresponds to means for transmitting the data to the RPR network.

Also, the reception data judgment unit 16 corresponds to receiving means of the present invention. Also, the RPR device address learning unit 17 and the RPR device address/user device address learning managing unit 20 correspond to address learning means of the present invention, the RPR device address learning unit 20 corresponds to a judge of the present invention, and the RPR device address/user device address learning managing unit 20 corresponds to a registration unit of the present invention.

<Operation>

An operation according to the present invention is described with reference to FIGS. 2 to 5.

(1) Packet Transmission Prior to MAC Address Learning (FIG. 3)

In the present invention, unlike the conventional technique, the routing table is not created by using the L3 routing protocol, and the RPR device captures the packet to be broadcast-transmitted, and a state in which the user device under the administration of the RPR device is connected is recognized from the MAC address learning, to create the correspondence table of the RPR device address/user device address.

In the following explanation, FIG. 2 is referenced to explain the process in the RPR device, and FIG. 3 is referenced to explain the position of each node and the process of frame (packet).

At first, a maintenance person carries out the initial settings of the RPR devices I, II, III and IV constituting the RPR rings (FIG. 3; (1)).

Each RPR device broadcast-transmits topology detection messages to the inner ring and the outer ring, in order to carry out the topology detection that is the conventional RPR technique. The topology detection message transmitted from each RPR device is received by another RPR device, and ring topology information is recognized.

The topology detection message is periodically transmitted. Then, each RPR device, when receiving the similar ring topology information continuously two times, creates the topology table with regard to the ring topology information. In this way, the topology map of the inner ring and outer ring is created by each RPR device.

Note that, the topology map manages, for each node (RPR device) on the RPR ring, the MAC address (RPR device address), TTL (Time to Live: indicating the position to the RPR device itself) to the inner and outer rings, and the state (FIG. 3: (2)).

The terminal A, when transmitting the packet to the terminal B, transmits an ARP packet (ARP request packet) into a subnet to which the terminal A belongs, in order to recognize the MAC address of the router X from a known IP address (FIG. 3; (3)).

The router X, when receiving the ARP packet, transmits the ARP response packet including its MAC address to the terminal A (FIG. 3; (4)). The terminal A can recognize the MAC address of the router X specified as the destination MAC address, by receiving the ARP response packet.

The terminal A, when recognizing the destination MAC address, firstly transmits a data packet to the router X, in order to transmit the packet to the terminal B (destination IP address: terminal B, FIG. 3: (5)).

The router X transmits the ARP request packet into the subnet to which the terminal B belongs, in order to recognize the MAC address of the terminal B from the destination IP address (FIG. 3; (6)). Consequently, the ARP request packet is transferred to the RPR device I from the router X.

In the RPR device I, the ARP packet from the router X is received at the port "a." The RPR device I recognizes the reception port of the ARP packet and the MAC address (the transmission source MAC address of the ARP packet) of the router X from the ARP packet at the reception user data judgment unit 14 shown in FIG. 2, and passes the ARP packet to the user address learning unit 15.

The user address learning unit 15 learns the correspondence between the MAC address of the router X recognized by the reception user data judgment unit 14 and the reception port, and creates the MAC learning table in the user device address/accommodation position learning table 21.

In order to transmit the ARP packet into the RPR ring, the reception user data judgment unit 14 passes the ARP packet to the transmission RPR device judgment unit 12.

Note that, in the conventional technique (FIG. 38), the MAC learning table is created, the ARP response packet is transmitted to the router X to terminate the IP. After that, the data packet to be transmitted to the RPR device I from the router X is received.

The transmission RPR device judgment unit 12 receiving the ARP packet from the reception user data judgment unit 14 passes the ARP packet to the RPR device address retrieving unit 13.

Note that, in the conventional technique (FIG. 38), the IP routing controller receiving the data packet recognizes that the terminal B is connected to the RPR device III from the routing table, in accordance with the destination IP address of the data packet, and adds the RPR header where the destination RPR device MAC address is set as the MAC address of the RPR device III.

The RPR device address retrieving unit 13 uses the destination MAC address of the ARP packet as a retrieval key, and retrieves the RPR-MAC address learning table (RPR device address/user device address correspondence table) 20A inside the RPR device address/user device address learning managing unit 20.

At this time, if the destination RPR device address is unknown, the transmission RPR device judgment unit 12 adds to the ARP packet, the RPR header in which the destination RPR device MAC address is set for a broadcast address and also the MAC address of the RPR device I is set for the transmission source RPR device MAC address, and passes to the transmission ring selector 11. Here, the destination RPR device address is assumed to be unknown.

The transmission ring selector 11 transmits the RPR data packet to a selected ring, after selecting any one of the inner ring and the outer ring to which it is transmitted, in accordance with the information of the RPR header and the topology map. Here, the transmission ring selector 11 transmits the RPR data packet to the RPR device II, which is the adjacent RPR device by using the outer ring (FIG. 3; (8)).

The reception data judgment unit 16 of the RPR device II receiving the RPR data packet from the RPR device I judges the destination MAC address of the RPR header (the destination RPR device MAC address). Here, the destination RPR device MAC address is the broadcast address.

For this reason, the reception data judgment unit 16 passes the RPR data packet to the transmission ring selector 11 and the transmission position judgment unit 18. At this time, the reception data judgment unit 16 passes the RPR data packet to even the RPR device address learning unit 17.

Note that, in the conventional technique (FIG. 38), the reception data judgment unit passes the RPR data packet to the transmission ring selector and the IP routing controller.

The IP routing controller-receiving the RPR data packet recognizes that there is no terminal whose destination IP address is coincident under the administration of the RPR device II from the routing table, in accordance with the destination IP address extracted from the ARP packet, and discards the ARP packet.

The RPR device address learning unit 17 receiving the RPR data packet uses the transmission source MAC address of the ARP packet in the RPR data packet as the retrieval key, and refers to the RPR-MAC address learning table within the RPR device address/user device address learning managing unit 20, and then judges whether or not the transmission source user device address is learned.

Here, it is assumed that the transmission source MAC address of the ARP packet has not been learned. In this case, the RPR device address learning unit 17 learns the correspondence between the transmission source RPR device MAC address of the RPR header and the transmission source MAC address of the ARP packet from the RPR data packet, and the RPR device address/user device address learning managing unit 20 creates the RPR-MAC address learning table 20A.

The transmission position judgement unit 18 removes the RPR header from the RPR data packet, and in accordance with the destination MAC address of the ARP packet (the broadcast), broadcast-transmits the ARP packet to the connection device (user device) under the administration of the RPR device II. However, under the administration of the RPR device II, there is no user device whose destination IP address is coincident. Thus, none respond thereto under the administration of the RPR device II.

On the other hand, the transmission ring selector 11 receiving the RPR data packet from the reception data judgment unit 16 selects any one of the inner and outer rings to which it is transmitted, from the information of the RPR header. Here, the outer ring is used to transmit the RPR data packet to the RPR device III corresponding to the adjacent RPR device.

When the RPR device III receives the RPR data packet from the RPR device II, similarly to the RPR device II, the reception data judgment unit 16 judges the destination MAC address of the RPR header.

The destination MAC address of the RPR header is the broadcast address. Thus, the reception data judgment unit 16 transmits the RPR data packet to the transmission ring selector 11 and passes to the RPR device address learning unit 17 and the transmission position judgment unit 18.

The RPR device address learning unit 17 learns the correspondence between the transmission source RPR device MAC address of the RPR header and the transmission source MAC address of the ARP packet, and the RPR device address/ user device address learning managing unit 20 creates the RPR-MAC address learning table 20A.

As for the RPR data packet which the transmission ring selector 11 receives from the reception data judgment unit 16, the operations similar to the RPR device II are executed. Thus, the RPR data packet is transmitted to the RPR device IV. In the RPR device IV, the RPR-MAC address learning table (the correspondence between the MAC address of the RPR device I and the MAC address of the router X) is learned and created (FIG. 3; (9)).

On the contrary, the transmission position judgement unit 18, when receiving the RPR data packet from the reception data judgment unit 16, removes the RPR header from this RPR data packet and identifies the destination MAC address of this packet.

At this time, the packet is the ARP packet, and the destination MAC address is the broadcast address. Thus, the transmission position judgement unit 18 broadcast-transmits the ARP packet to the user devices (all of the user interfaces) under the administration of the RPR device III, without any instruction to the user address retrieving unit 19 (FIG. 3; (10)).

At this time, the ARP packet is transmitted even from the user interface (accommodation port) "b" corresponding to the terminal B, and arrives at the terminal B through a layer 2 switch (L2SW) Y. In this way, the ARP packet transmitted from the router X is received by the terminal B.

According to the above-mentioned operations, each RPR device on the ring captures the RPR data packet broadcast-transmitted and extracts its transmission source RPR device MAC address and transmission source MAC address.

Consequently, the correspondence between the RPR device address and the MAC address can be learned to create the correspondence table between the RPR device address and the user device address (the MAC-RPR address learning table 20A). Thus, each RPR device can recognize the user device under the administration thereof, which is connected to each RPR device.

In the above-mentioned example, the MAC-RPR learning table 20A indicating the correspondence between the MAC address of the router X and the MAC address of the RPR device I is created by each of the RPR devices I to IV.

Consequently, each of the respective RPR devices I to IV can recognize that the router X is connected as the user device under the administration of the RPR device I.

(2) Packet Transmission after MAC Address Learning (FIG. 4)

The present invention does not recognize the RPR device having the user device under the administration thereof, from the routing table created by using the L3 routing protocol, unlike the conventional technique, but recognizes the RPR device to which the user device is connected from the RPR-MAC address learning table 20A created by the RPR device, and consequently allows the packet to be transmitted and received between the user devices. In the following explanation, FIG. 2 is referenced to explain the process in the RPR device, and FIG. 4 is referenced to explain the position of each node and the process of frame.

The terminal B receiving the ARP packet through the operations shown in FIG. 3 transmits the ARP response packet to the router X (FIG. 4; (11)).

In the RPR device III, the ARP response packet transmitted from the terminal B is received through the layer 2 switch Y at the port "b." Then, the reception user data judgment unit 14 of the RPR device III passes the ARP response packet to the transmission RPR device judgment unit 12 and the user address learning unit 15.

The user address learning unit 15 learns the correspondence between the MAC address of the terminal B judged by the reception user data judgment unit 14 and the port "b" receiving the ARP response packet, and sets this correspondence for the user device address/accommodation position learning table (MAC learning table) 21.

In this way, the user address learning unit 15 creates the MAC learning table 21 indicating the correspondence between the user device address and the accommodation position.

The transmission RPR device judgment unit 12 receiving the ARP response packet from the reception user data judgment unit 14 passes to the RPR device address retrieving unit 13, in order to transfer the ARP response packet in the RPR ring by transparent.

Consequently, a determining process for the destination (the destination RPR device MAC address) in the RPR network to the ARP response packet is carried out (FIG. 4; (12)).

Note that, in the conventional technique (FIG. 38), the RPR device terminates IP. Thus, the IP routing controller extracts the destination IP address from the ARP response packet, and recognizes that the router X exists forward of the RPR device I from the routing table.

The RPR device address retrieving unit 13 receiving the ARP response packet uses the destination MAC address of the ARP response packet (the MAC address of the router X) as the retrieval key, and retrieves the RPR-MAC address learning table 20A of the RPR device address/user device address learning managing unit 20.

At this time, as the RPR device MAC address corresponding to the destination MAC address, the MAC address of the RPR device I is detected. Consequently, it is possible to recognize that the router X exists forward (under the admiration) of the RPR device I can be recognized.

The transmission RPR device judgment unit 12 receives the destination RPR device MAC address (the MAC address of the RPR device I) corresponding to the destination MAC address as the retrieval result from the RPR device address retrieving unit 13.

Then, the transmission RPR device judgment unit 12 determines the MAC address of the RPR device I as the destination RPR device MAC address of the ARP response packet. Then, the transmission RPR device judgment unit 12 adds the RPR header, in which the MAC address of the RPR device I is set as the destination RPR device MAC address, to the ARP response packet, and consequently creates the RPR data packet, and then passes to the transmission ring selector 11.

The transmission ring selector 11 selects any one of the inner and outer rings to which the RPR data packet is transmitted, from the information of the RPR header. Here, the inner ring is used to transfer the RPR data packet to the RPR device II which is the adjacent RPR device (FIG. 4; (13)).

The reception data judgment unit 16 receiving the RPR data packet from the RPR device III judges the destination MAC address of the RPR header. The destination MAC address of the RPR header is the MAC address of the RPR device I, and it is different from the self-node MAC address (the MAC address of the RPR device II).

In this case, the reception data judgment unit 16 passes the RPR data packet to the transmission ring selector 11 and the RPR device address learning unit 17, without passing the RPR data packet to the transmission position judgement unit 18.

Note that, in the conventional technique (FIG. 38), the reception data judgment unit passes to the transmission ring selector without passing the RPR data packet to the IP routing controller.

The RPR device address learning unit 17 uses the transmission source MAC address of the ARP response packet as the retrieval key, and retrieves the RPR-MAC address learning table inside the RPR device address/user device address learning managing unit 20. Here, it is assumed that the MAC address corresponding to the retrieval key (the MAC address of the terminal B) is not learned.

In this case, the RPR device address learning unit 17 learns the correspondence between the transmission source MAC address of the RPR header (the MAC address of the RPR device III) and the transmission source MAC address of the ARP response packet from the RPR data packet, and creates the RPR-MAC address learning table 20A indicating this correspondence inside the RPR device address/user device address learning managing unit 20.

The transmission ring selector 11, when receiving the RPR data packet, selects any one of the inner and outer rings to which the RPR data packet is transmitted, from the information of the RPR header. Here, the transmission ring selector 11 uses the inner ring to transmit the RPR data packet to the RPR device I which is the adjacent RPR device.

When the RPR I receives the RPR data packet from the RPR device II, similarly to the RPR device II, the reception data judgment unit 16 judges the destination MAC address of the RPR header.

Here, the destination MAC address of the RPR header is coincident with the self-node MAC address (MAC address of the RPR device itself). Thus, the reception data judgment unit 16 passes the RPR data packet to the RPR device address learning unit 17 and the transmission position judgment unit 18 without passing the RPR data packet to the transmission ring selector 11.

Note that, in the conventional technique (FIG. 38), the reception data judgment unit passes the RPR data packet to the IP routing controller. The IP routing controller recognizes the existence of the router X under the administration of the RPR device I from the routing table, in accordance with the destination IP address extracted from the ARP response packet, and passes the ARP response packet to the transmission position judgement unit.

The RPR device address learning unit 17 learns the correspondence between the transmission source MAC address of the RPR header and the transmission source MAC address of the ARP response packet, if the transmission source RPR device MAC address has not been learned, and the RPR device address/user device address learning managing unit 20 creates the RPR-MAC address learning table 20A.

The transmission position judgment unit 18, when receiving the RPR data packet from the reception data judgment unit 16, removes the RPR header from the RPR data packet. In succession, the transmission position judgment unit 18 judges whether or not the destination MAC address of the ARP response packet is the broadcast address.

Here, since the destination MAC address is not the broadcast address, the destination MAC address of the ARP response packet is passed to the user address retrieving unit 19.

The user address retrieving unit 19 uses the destination MAC address as the retrieval key and retrieves the MAC address learning table (user device address/accommodation position learning table 21). Here, as the port number corresponding to the destination MAC address (the MAC address of the router X), the port "a" is retrieved. Then, the user address retrieving unit 19 notifies the transmission position judgment unit 18 of this port number.

The transmission position judgment unit 18, when receiving the port number of the port "a" as the retrieval result from the user address retrieving unit 19, transmits the ARP response packet from the user device interface corresponding to the port "a."

As mentioned above, the ARP response packet transmitted from the terminal B is received by the router X (FIG. 4; (14)).

The router X, when receiving the ARP response packet from the RPR device I, transmits the data packet (MAC frame) received from the terminal A to the terminal B. The RPR device I has already learned the fact that the terminal B is connected to the RPR device III.

For this reason, the router X transfers the data packet, to which the RPR header where the MAC address of the RPR device III is set for the destination RPR device MAC address is added, to the RPR device III. Then, the RPR device III transmits the data packet, from which the RPR header is removed, from the port "b." Consequently, the data packet from the terminal A arrives at the terminal B.

After that, when the data packet (MAC frame) is transmitted to the terminal A from the terminal B, the RPR device III adds the RPR header, in which the MAC address of the RPR device I is set as the destination RPR device address, to the data packet, and transfers to the RPR device I. The RPR device I transmits the data packet, from which the RPR header is removed, from the port "a" to the router X. The router X transmits the data packet to the terminal A.

According to the above-mentioned operation, between the time when the router X transmits the ARP packet to the RPR device I and the time when the ARP response packet is received from the RPR device I, each RPR device learns the correspondence between the transmission source RPR device MAC address and the transmission source MAC address.

Thus, after that, the transmission/reception of the data packet can be executed without transmitting the broadcast packet between the terminal A and the terminal B.

That is, by recognizing the RPR device to which the transmission destination user device is connected from the correspondence table (the RPR-MAC address learning table 20A) of the RPR device address/user device address created by the MAC address learning in the RPR device, the packet transmission/reception becomes possible between the user devices.

(3) Packet Transmission Using L2 Grouping Identifier (FIG. 5)

In the present invention, the L2 grouping identifier can be set for each RPR device. Consequently, the filtering can be performed in such a way that each RPR device captures only the RPR data packet addressed to the self-RPR device (the RPR device itself).

In the following explanation, FIG. 2 is referred to explain the operations of the components of the RPR device, and the position of each node and the process of frame are explained with reference to FIG. 5.

In the network system shown in FIG. 5, the terminal A, the router X, the RPR devices I and III, and the terminal B are assumed to belong to a first L2 group (registration L2 grouping identifier: 1), and the RPR devices II and IV are assumed to belong to a second L2 group (registration L2 grouping identifier: 2).

The operations from the time when the respective RPR devices I to IV create the topology map, and the router X transmits the ARP packet using the L2 grouping identifier to the RPR device I, until the time when the RPR device I adds the RPR header and transmits the RPR data packet to the RPR device II are similar to the operations in the above-mentioned (1).

When the RPR device II receives the RPR data packet from the RPR device I, the reception data judgment unit 16 of the RPR device II judges whether or not the RPR data packet uses the L2 grouping identifier (whether or not the L2 grouping identifier is set for the RPR data packet).

At this time, if the L2 grouping identifier is used, the reception data judgment unit 16 judges whether or not a value of the L2 grouping identifier is coincident with a value (registration L2 grouping identifier: 1) registered in the self-node (RPR device ifself).

Here, the value of the L2 grouping identifier of the RPR data packet is not coincident with the value of the L2 grouping identifier registered in the self-node. In this case, the RPR device II does not execute the judgment of the destination MAC address of the RPR header and the learning of the correspondence between the transmission source RPR device address and the transmission source user device address.

That is, if the value of the L2 grouping identifier is different, the reception data judgment unit 16, though the value of the destination MAC address of the RPR header is by specified broadcast, does not receive this RPR data packet (does not pass to the RPR device address learning unit 17 and the transmission position judgment unit 18) and passes only to the transmission ring selector 11.

The transmission ring selector 11 having received the RPR data packet from the reception data judgment unit 16 selects any one of the inner and outer rings to which the RPR data packet is transmitted, from the information of the RPR header. Here, the outer ring is used to transmit the RPR data packet to the RPR device III, which is the adjacent RPR device.

When the RPR device III receives the RPR data packet from the RPR device II, the reception data judgment unit 16 of the RPR device III judges whether or not the L2 grouping identifier is set for the RPR data packet, similarly to the RPR device II. Here, the value of the L2 grouping identifier of the RPR data packet is coincident with the value (registration L2 grouping identifier: 1) registered in the self-node.

In this case, the reception data judgment unit 16 judges the destination MAC address of the RPR header, and the destination MAC address is the broadcast address. Thus, the RPR data packet is passed to the RPR device address learning unit 17 and the reception data judgment unit 16.

The RPR device address learning unit 17 learns the correspondence between the transmission source MAC address of the RPR header and the transmission source MAC address of the ARP packet, similarly to the (1). The RPR device address/user device address learning managing unit 20 creates the RPR-MAC address learning table 20A.

The transmission ring selector 11, when receiving the RPR data packet, carries out the operations similar to the RPR device II. That is, the RPR data packet is transmitted from the RPR device III to the RPR device IV.

The RPR device IV, since the L2 grouping identifier of the RPR data packet is not coincident with the value of the self-node, carries out the operations similar to the RPR device II, and does not learn the correspondence between the transmission source RPR device address related to the RPR data packet and the user device address.

The transmission position judgment unit 16, when receiving the RPR data packet from the reception data judgment unit 16, removes the RPR header, and broadcast-transmits the ARP packet to the user device under the administration of the RPR device III.

Since the operations after this are similar to the above-mentioned (1) and (2), their explanations are omitted. In this way, when the L2 grouping identifier is applied to the present invention, by using the L2 grouping identifier set for each RPR device, each RPR device carries out the filtering process so that only the RPR data packet addressed to the RPR device itself is captured.

Consequently, only the RPR-MAC address learning table of the RPR data packet related to the self-RPR device can be created. That is, it is not necessary to create the unnecessary RPR-MAC address learning table. Also, it is possible to suppress the transmission of the unnecessary broadcast address to the user device interface.

MODIFIED EXAMPLE

The configuration of the RPR device explained by referring to FIG. 2 to FIG. 5 can be modified as explained below.

In the above-mentioned operations, the reception data judgment unit 16, if the destination RPR device address of the RPR header of the RPR data packet is addressed to the RPR device ifself, passes the RPR data packet to the transmission position judgment unit 18 and the RPR device address learning unit 17, and if the destination RPR device address is the broadcast address, passes the RPR data packet to the transmission ring selector 11, the transmission position judgment unit 18 and the RPR device address learning unit 17, and if the destination RPR device address is the RPR data packet other than them, passes to the transmission ring selector 11 and the RPR device address learning unit 17.

That is, the reception data judgment unit 16, if the RPR data packet should be captured by its own device, is configured so as to pass this RPR data packet to the transmission position judgment unit 18.

Here, the reception data judgment unit 16 can be configured so as to pass the RPR data packet to the RPR device address learning unit 17 and the transmission position judgment unit 18 at substantially the same time, if passing the RPR data packet to the transmission position judgment unit 18.

In this case, the transferring process for the RPR data packet and the learning process for the RPR-MAC address are executed in parallel (the RPR device address learning unit 17 discards the RPR data packet after the process thereof).

On the contrary, it is possible to adopt such a configuration that the reception data judgment unit 16 once passes the RPR data packet to the RPR device address learning unit 17, the RPR device address learning unit 17 returns the RPR data packet to the reception data judgment unit 16 after the process thereof, and the reception data judgment unit 16 passes the RPR data packet to the transmission position judgment unit 18.

This case does not require the process that the reception data judgment unit 16 generates a copy of the RPR data packet and passes to the RPR device address learning unit 17.

Instead of the above-mentioned configuration, it is possible to adopt such a configuration that the reception data judgment unit 16, if the destination RPR device address of the RPR data packet is addressed the RPR device itself, passes the RPR data packet to the RPR device address learning unit 17 without passing to the transmission position judgment unit 18, and the RPR device address learning unit 17 passes the RPR data packet to the transmission position judgment unit 18 after the learning process.

Also, it is possible to adopt such a configuration that, if the destination RPR device address is the broadcast address, the reception data judgment unit 16 passes the RPR data packet to the RPR device address learning unit 17, and the RPR device address learning unit 17 passes the RPR data packet to the transmission ring selector 11 and the transmission position judgment unit 18 after the learning process.

Moreover, it is possible to adopt such a configuration that, if the destination RPR device address is not addressed to its own device and not by specified broadcast, the reception data judgment unit 16 passes the RPR data packet to the RPR device address learning unit 17, and the RPR device address learning unit 17 passes the RPR data packet to the transmission ring selector 11 after the learning process. That is, it is possible to adopt such a configuration that the RPR data packet is passed between the components only one time.

Also, in the above-mentioned configuration, the reception user data judgment unit 14 passes the packet received from the user device interface, to the transmission RPR device judgment unit 12 and the user address learning unit 15.

Here, the reception user data judgment unit 14 can be configured so as to pass the packet to the transmission RPR device judgment unit 12 and the user address learning unit 15 at almost the same time, similarly to the reception data judgment unit 16. On the contrary, the reception user data judgment unit 14 may be configured so as to once pass the packet to the user address learning unit 15, and receive the packet from the user address learning unit 15 after the completion of the process of the user address learning unit 15, and then pass to the transmission RPR device judgment unit 12.

Moreover, the reception user data judgment unit 14 may be configured so as to pass the packet only to the user address learning unit 15 and pass the packet to the transmission RPR device judgment unit 12 after the user address learning unit 15 carries out the learning process.

Moreover, in the case where the L2 grouping identification is used, the reception data judgment unit 16 is configured so as to directly refer to the L2 grouping identifier of the self-node managed by the RPR device address/user device address learning managing unit 20, for the sake of the collating process with the L2 grouping identifier.

Instead of this configuration, it can be configured such that the reception data judgment unit 16 receives the L2 grouping identifier of the self-node from the RPR device address learning unit 17, in linkage with the RPR device address learning unit 17, and carries out the collating process with the L2 grouping identifier set for the RPR data packet.

Also, in the above-mentioned operation example, the ARP packet is transferred through the outer ring from the RPR device I to the RPR device III, and the ARP response packet is transferred through the inner ring from the RPR device III to the RPR device I. However, in the present invention, the route of the RPR data packet (difference between the inner/outer rings) can be properly set.

EMBODIMENT

An embodiment of the present invention will be described below. The phrases used in the following embodiment are explained below.

The "ring topology information" includes information on the MAC address of the RPR device existing on the ring network, the number of hops from the self-RPR device, and the like.

The "Topology Map" means the table storing the ring topology information collected in the topology detection.

The "VLAN ID" is the identifier for identifying VLAN (Virtual LAN), and a unique value in the layer 2 network, and corresponds to the above-mentioned "L2 Grouping Identifier".

The "RPR data packet" is the packet (MAC frame) to which the RPR header is added. In the RPR ring network, the packet (MAC frame) from the outside of the ring is encapsulated on the basis of a format (including the RPR header) in accordance with the RPR, and transferred on the ring.

The RPR header includes: the MAC address of the RPR device of the transmission source (the transmission source RPR device MAC address); and the MAC address of the RPR device of the destination (the destination RPR device MAC address), as the information indicating the transmission source and destination in the RPR ring network.

Figure 6:
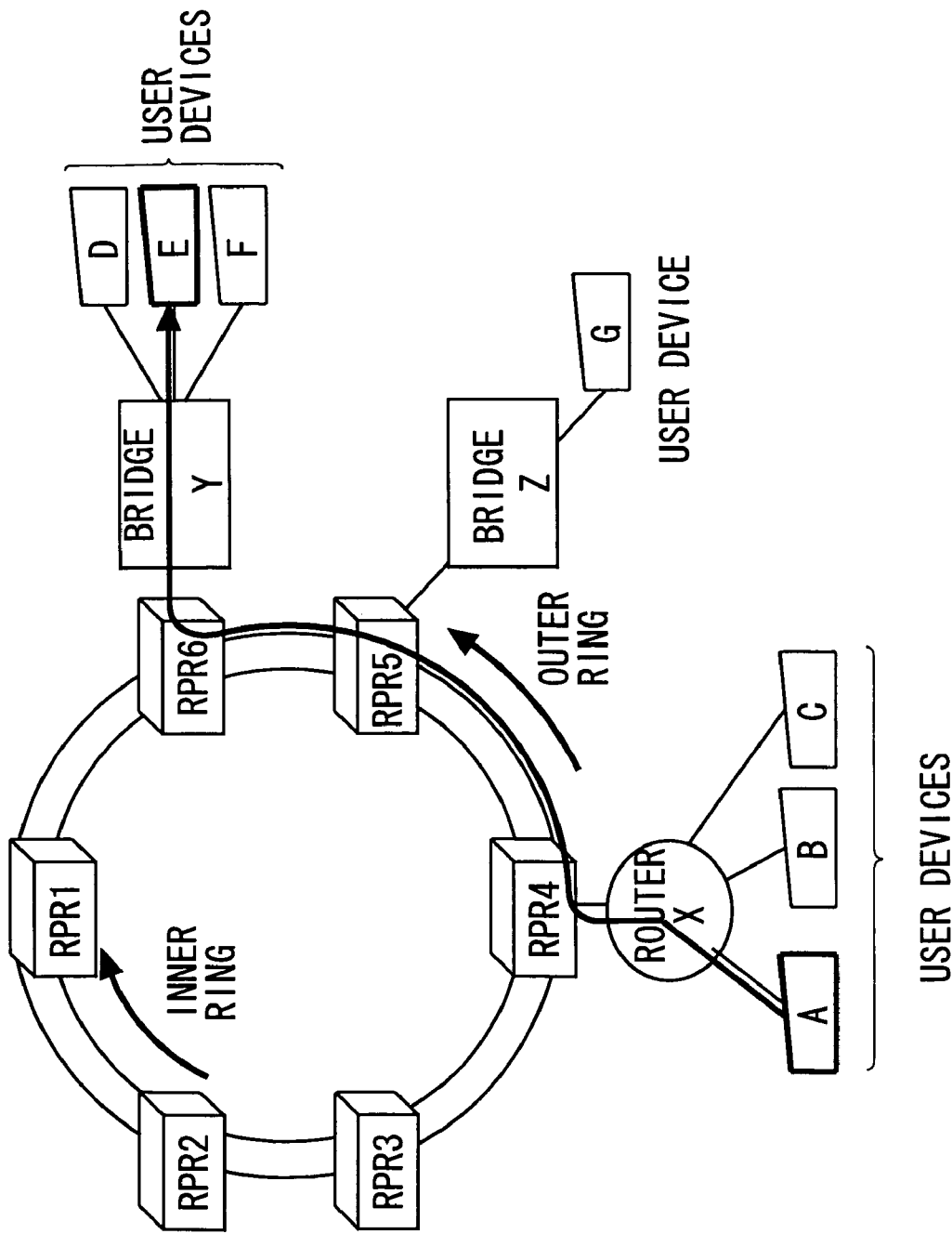
FIG. 6 is a view showing a network configuration example (when an L2 grouping identifier is not used), according to an embodiment.
Figure 7:
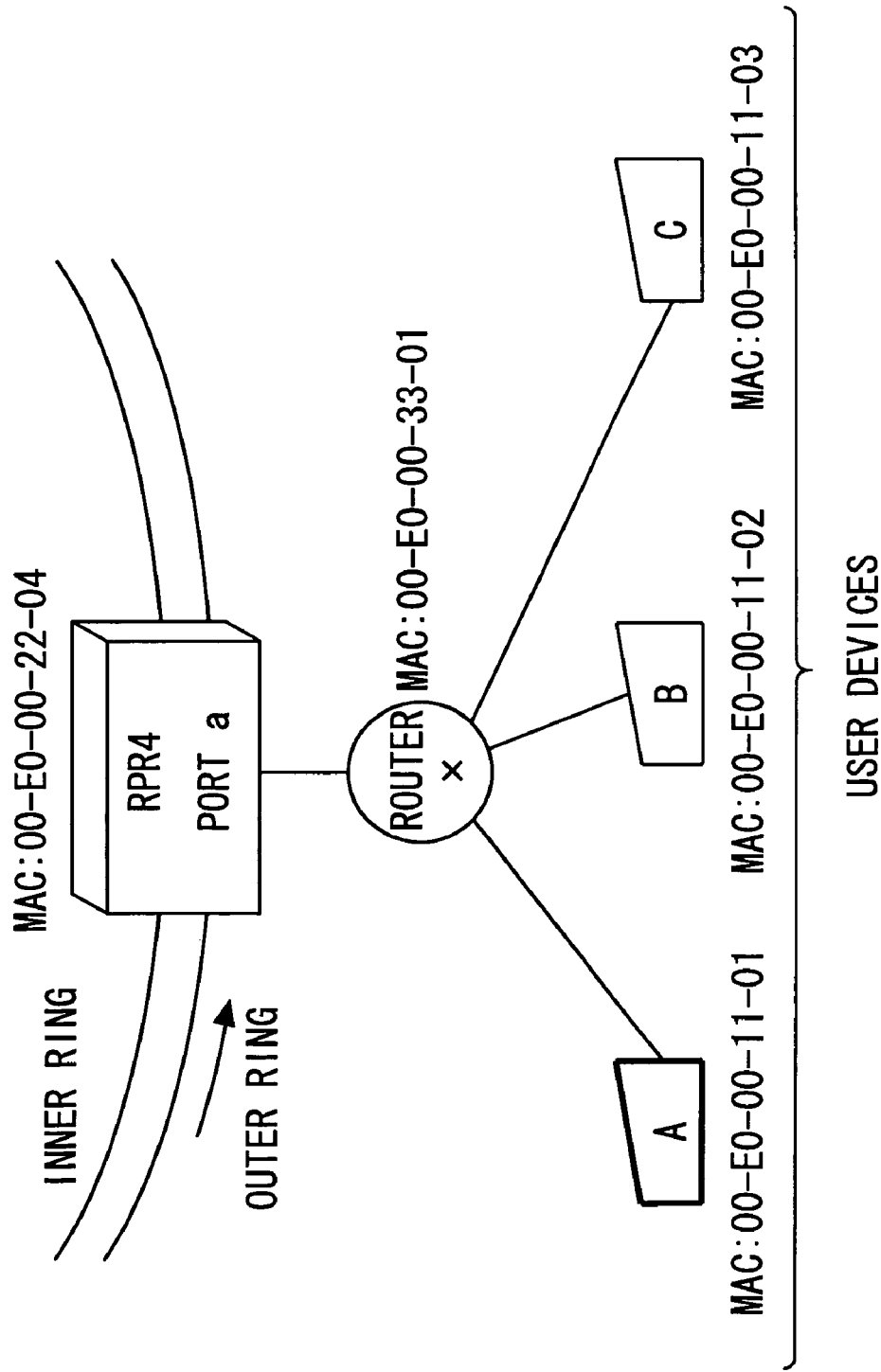
FIG. 7 is a view showing a network configuration under an administration of an RPR device according to the embodiment.
Figure 8:
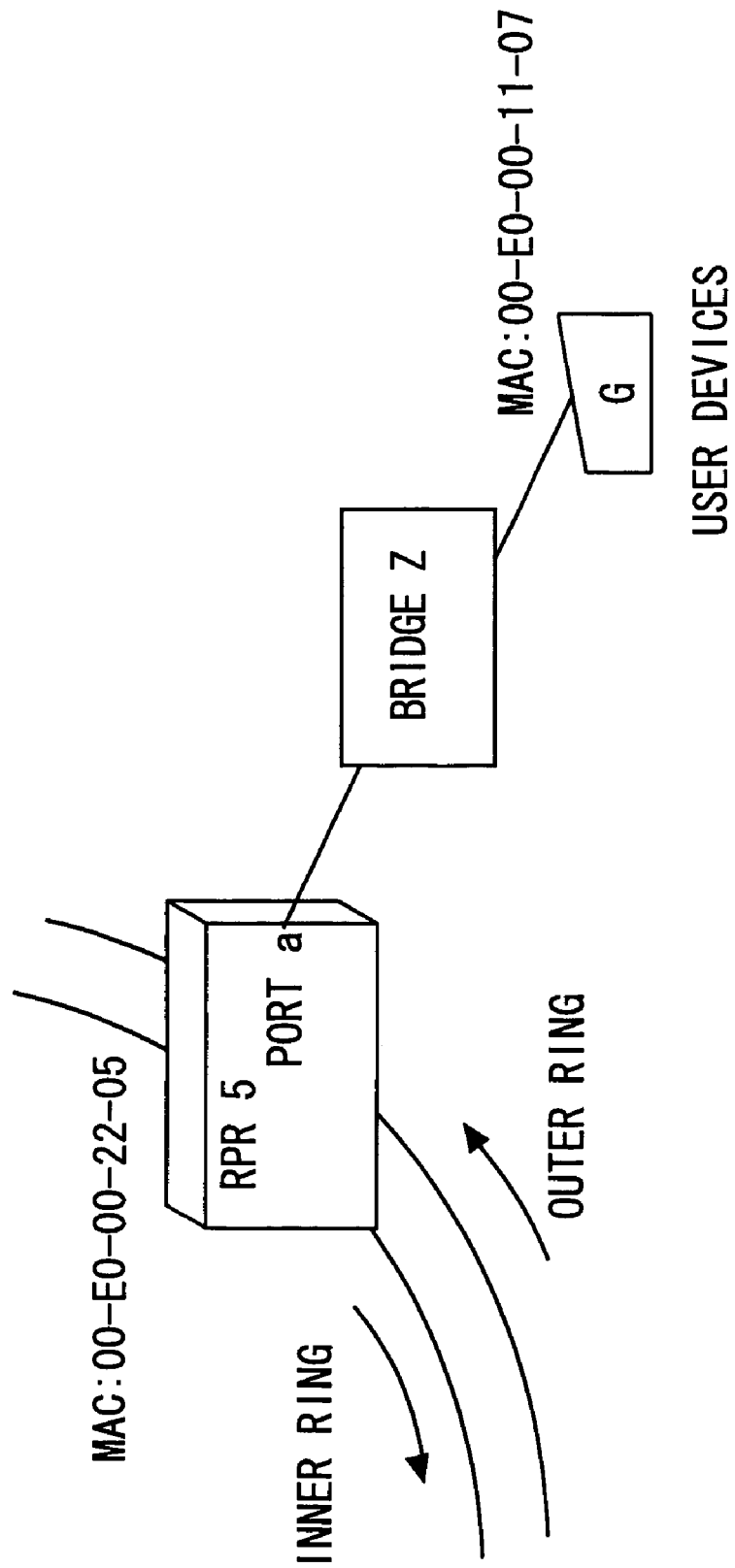
FIG. 8 is a view showing a network configuration under an administration of an RPR device according to the embodiment.
Figure 9:
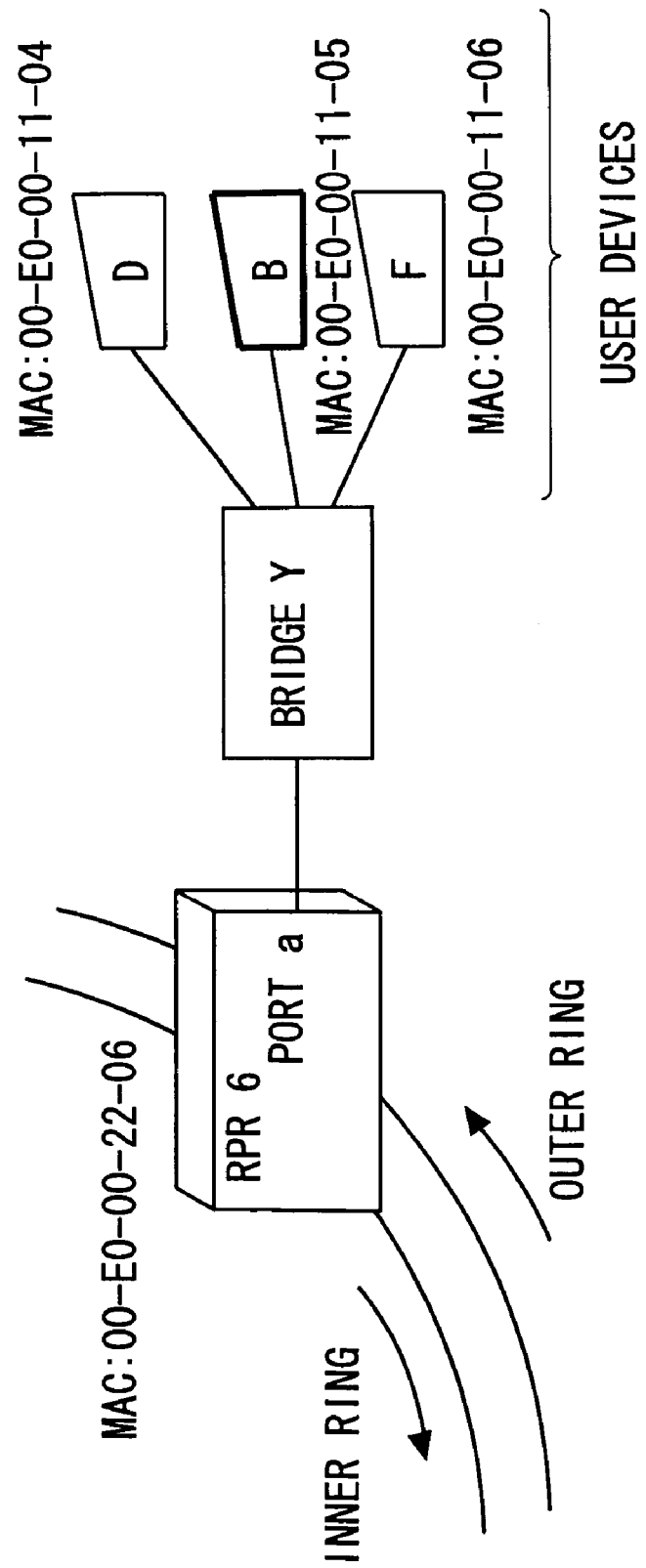
FIG. 9 is a view showing a network configuration under an administration of an RPR device according to the embodiment.

FIG. 6 to FIG. 36 are explanation views of an embodiment of the present invention. FIG. 6 is a view showing a network configuration example in the embodiment. FIG. 7 is a view showing a network configuration under an administration of an RPR device 4 in the embodiment. FIG. 8 is a view showing a network configuration under an administration of an RPR device 5 in the embodiment. FIG. 9 is a view showing a network configuration under an administration of an RPR device 6 in the embodiment.

Figures 10, 11:
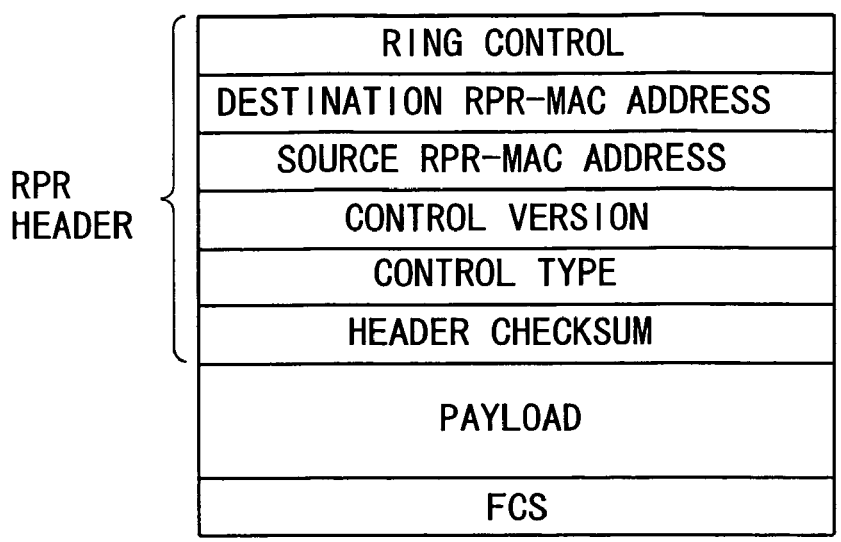
FIG. 10 is a format explanatory view of a topology detection message according to the embodiment.
FIG. 11 is an explanatory view of set information of the topology detection message shown in FIG. 10.
Figure 15:
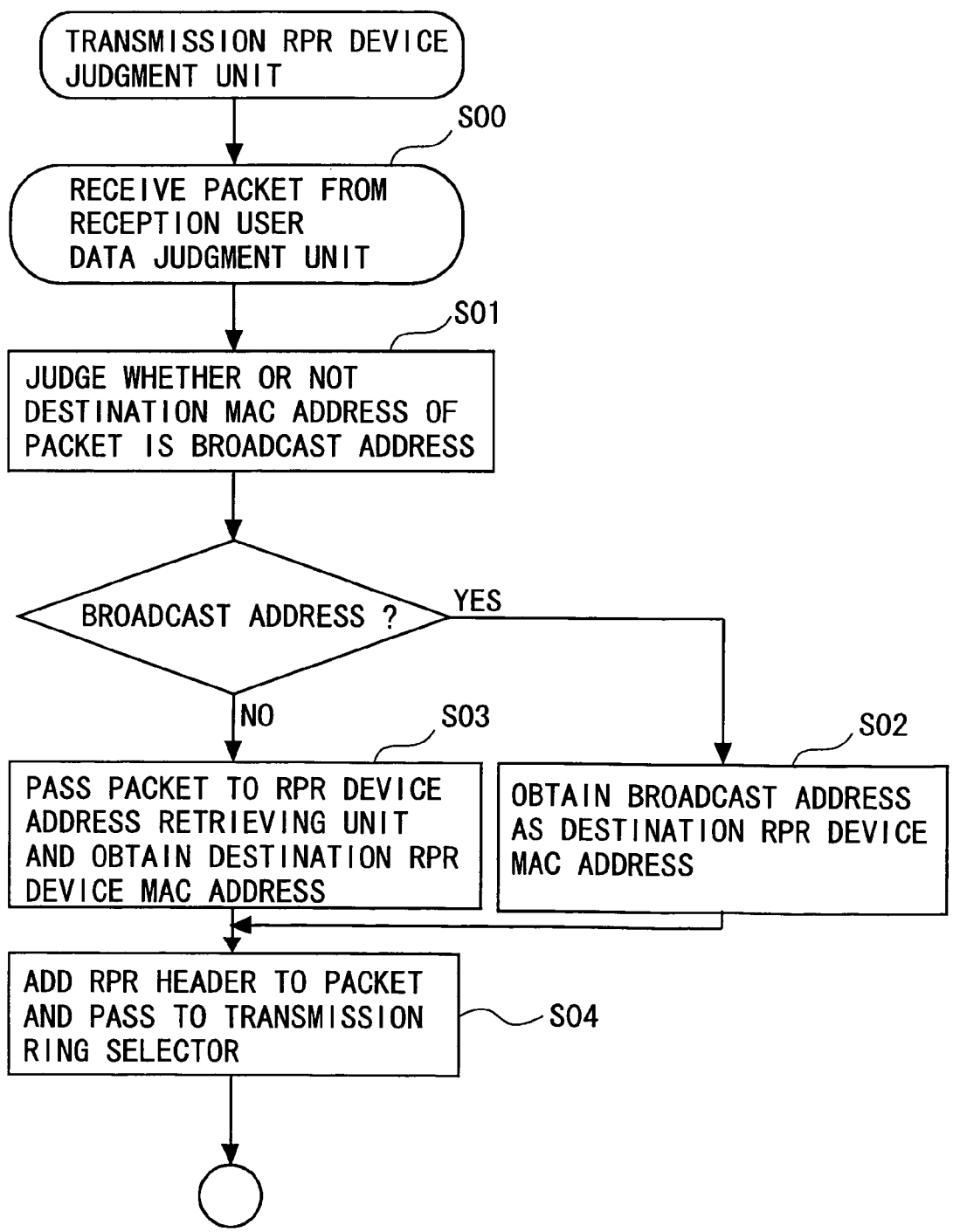
FIG. 15 is a flowchart showing a process of a transmission RPR device judgment unit according to the embodiment.
Figures 16, 17:
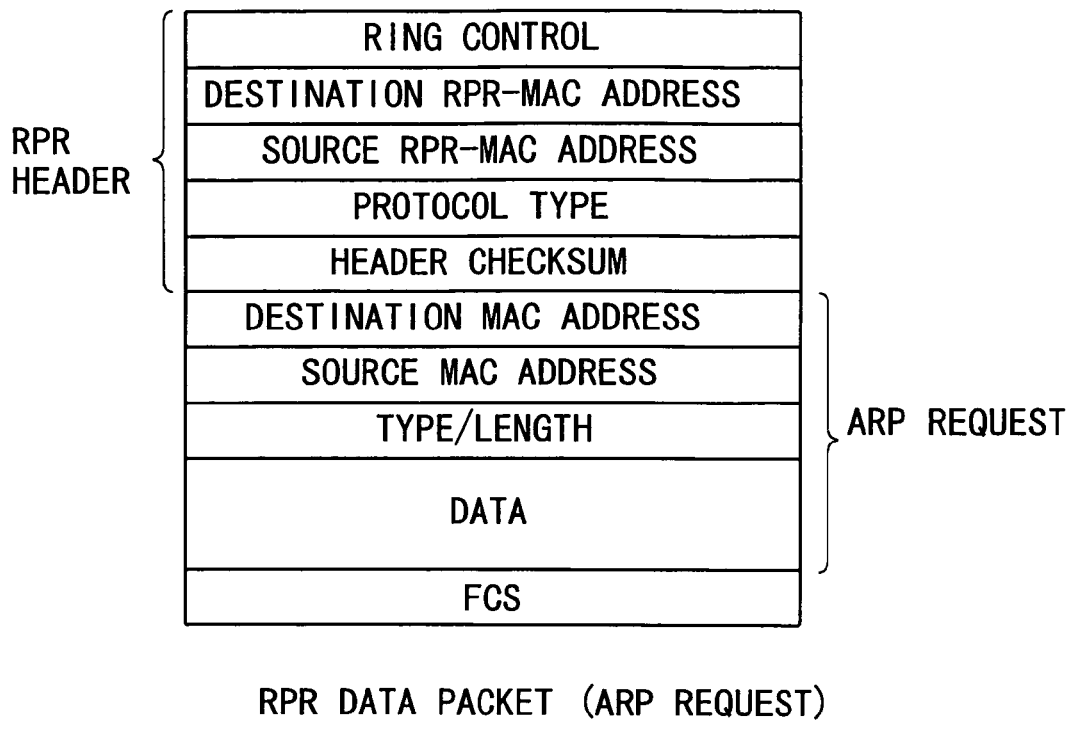
FIG. 16 is a format explanatory view of an RPR data packet (ARP request) according to the embodiment.
FIG. 17 is an explaining view of the set information of the RPR data packet (ARP request) shown in FIG. 16.
Figure 18A:
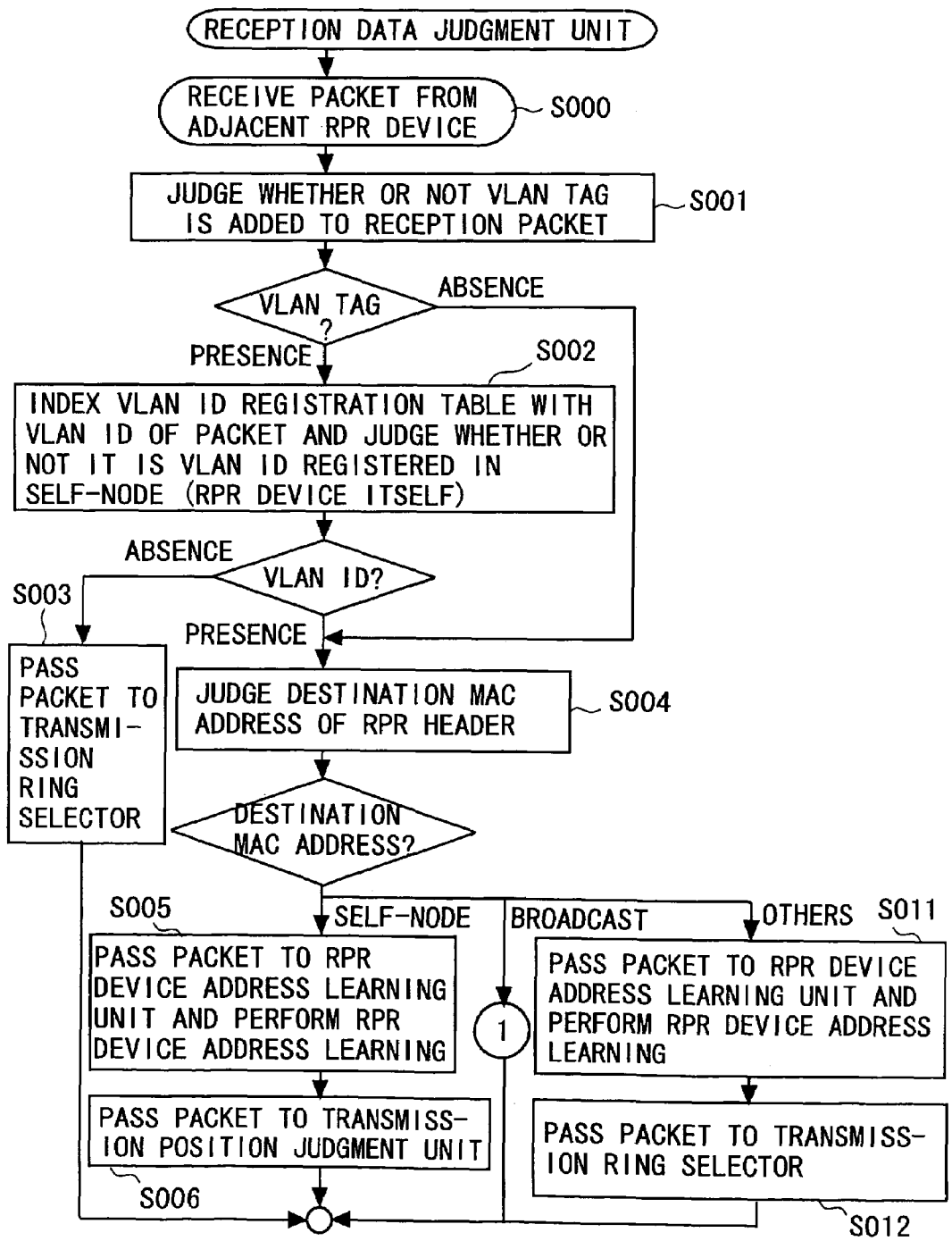
FIGS. 18A and 18B are flowcharts showing a process of a reception data judgment unit according to the embodiment.
Figure 18B:
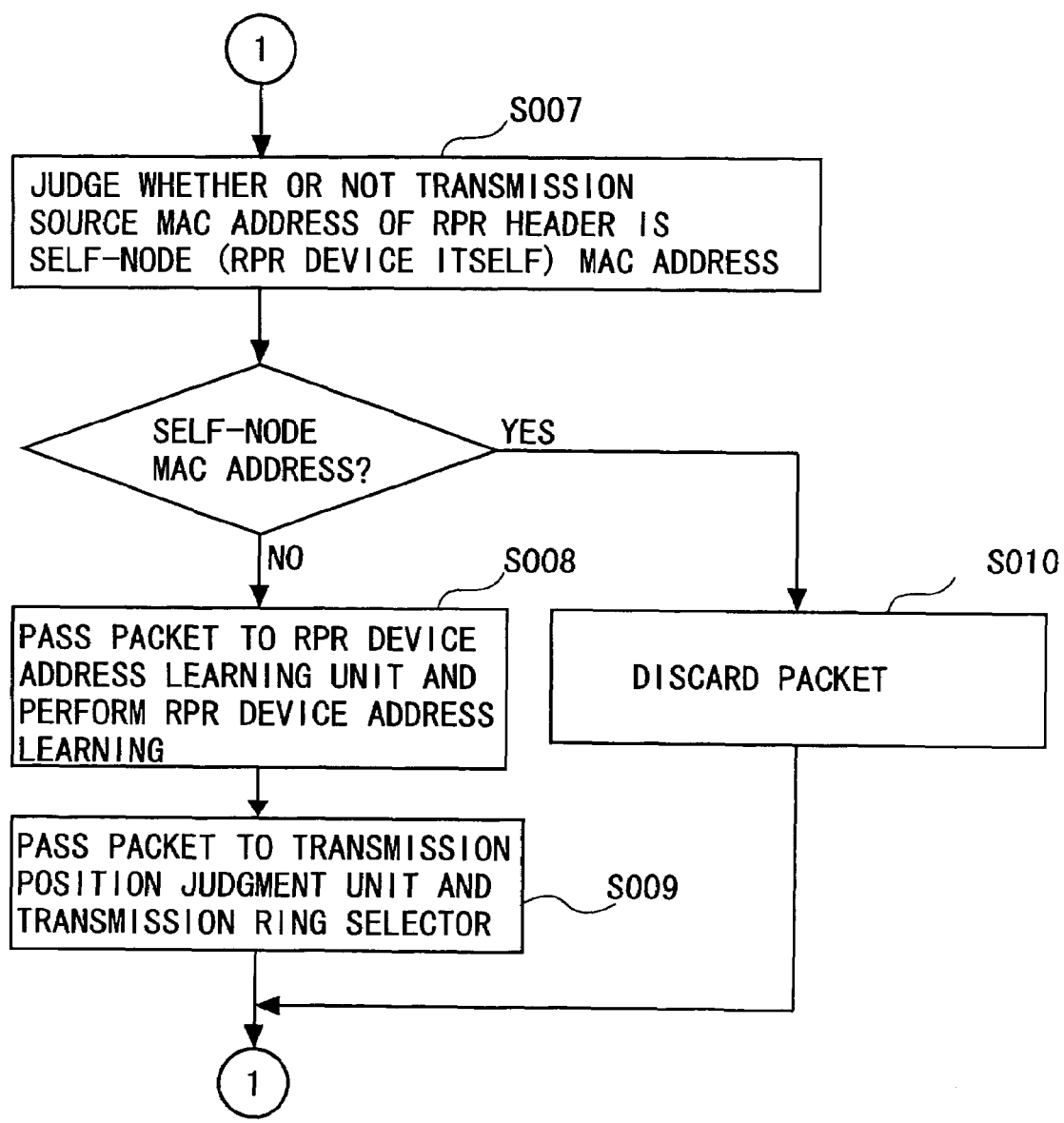
Figure 19:
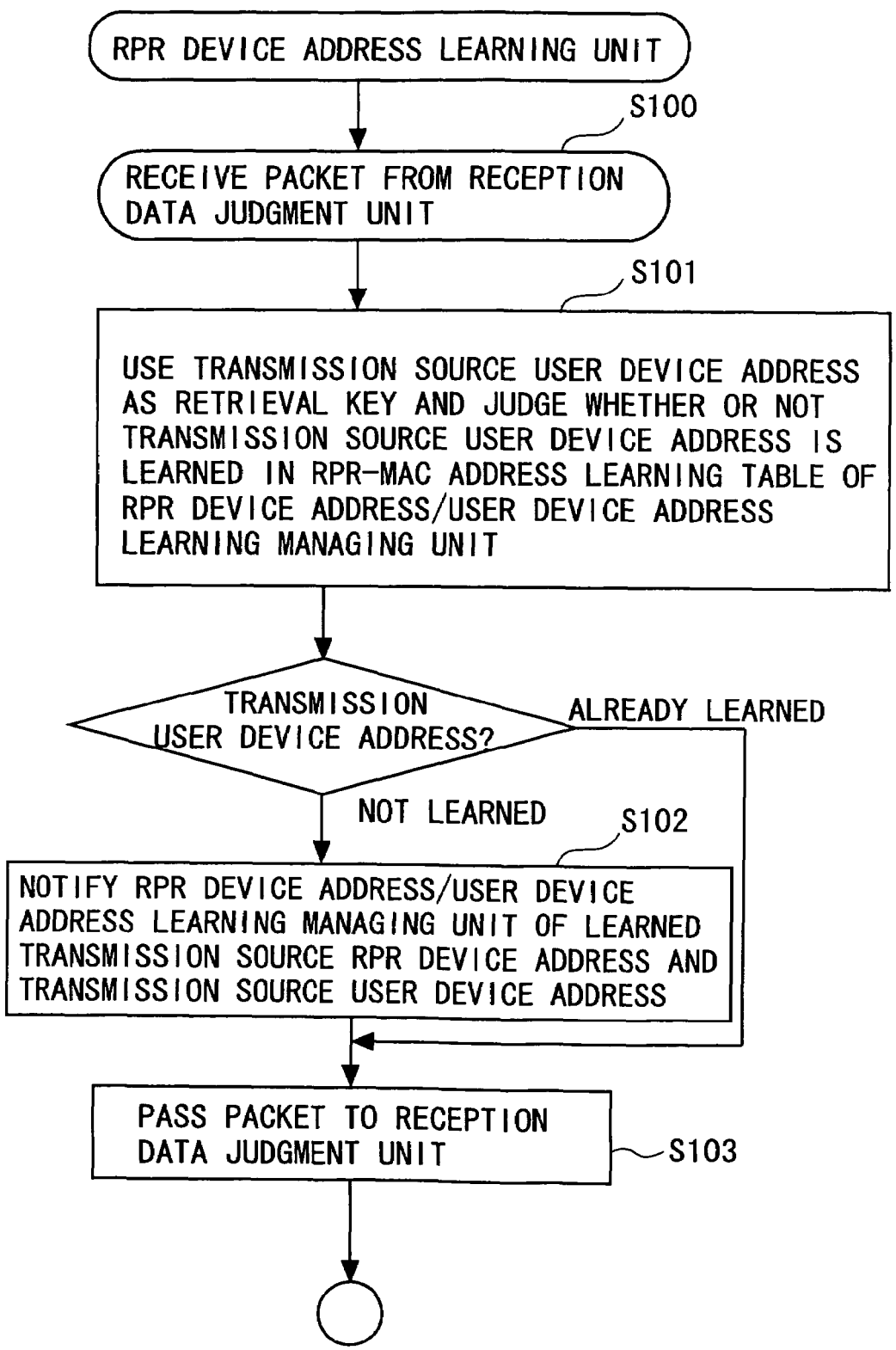
FIG. 19 is a flowchart showing a process of an RPR device address learning unit according to the embodiment.

Also, FIG. 10 is a format explanatory view of a topology detection message in the embodiment. FIG. 11 is an explaining view of the set information of the topology detection message in the embodiment. FIG. 12 is a format explaining view of an ARP request packet in the embodiment. FIG. 13 is an explaining view of the set information of the ARP request packet in the embodiment. FIG. 14 is a view showing a MAC address learning table of the RPR device 4. FIG. 15 is a flowchart showing a process of a transmission RPR device judgment unit in the embodiment. FIG. 16 is a format explaining view of an RPR data packet (ARP request) in the embodiment. FIG. 17 is an explaining view of the set information of the RPR data packet (ARP request) in the embodiment. FIGS. 18A and 18B are flowcharts showing a process of a reception data judgment unit in the embodiment. FIG. 19 is a flowchart showing a process of an RPR device address learning unit in the embodiment.

Figure 20:
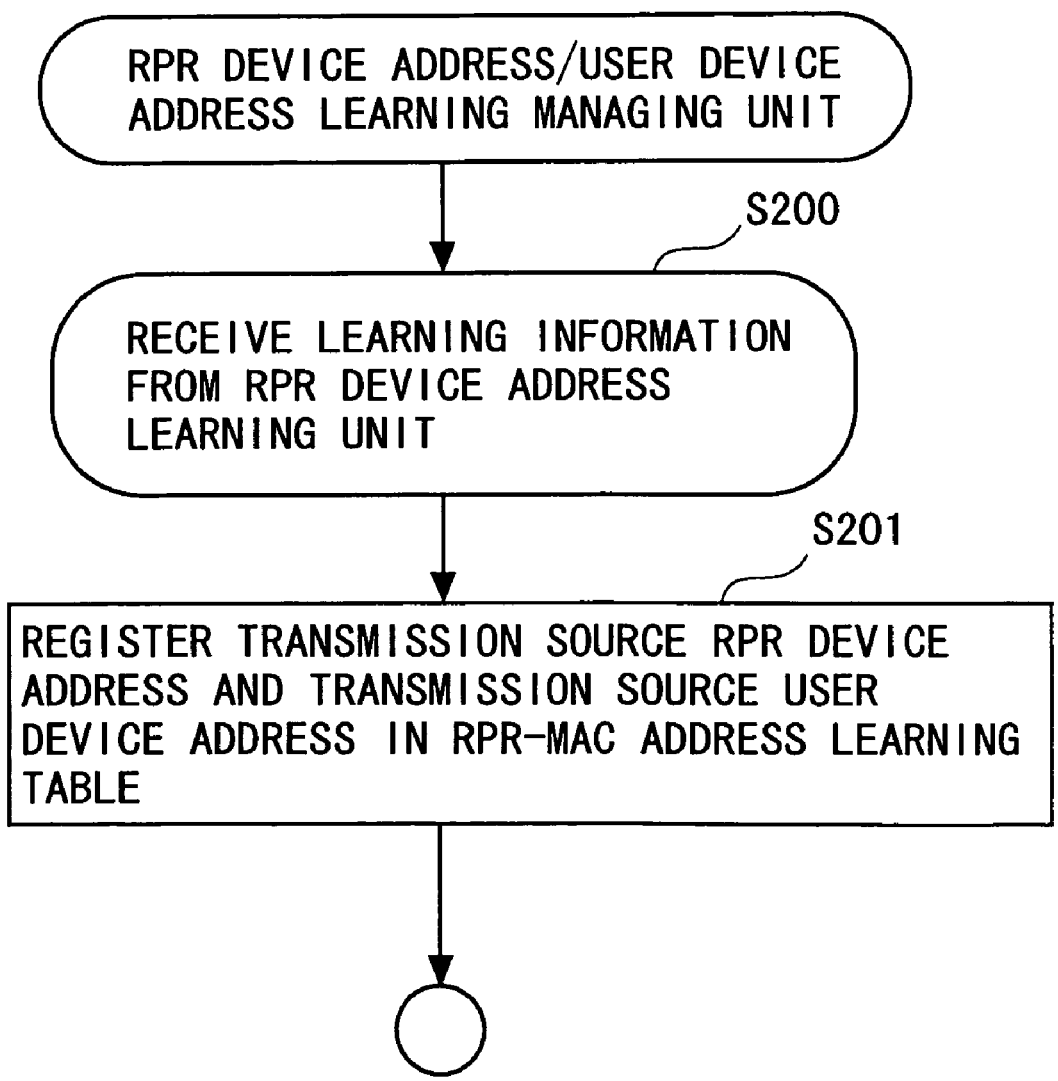
FIG. 20 is a flowchart showing a process of an RPR device address/user device address learning management unit according to the embodiment.
Figure 24:
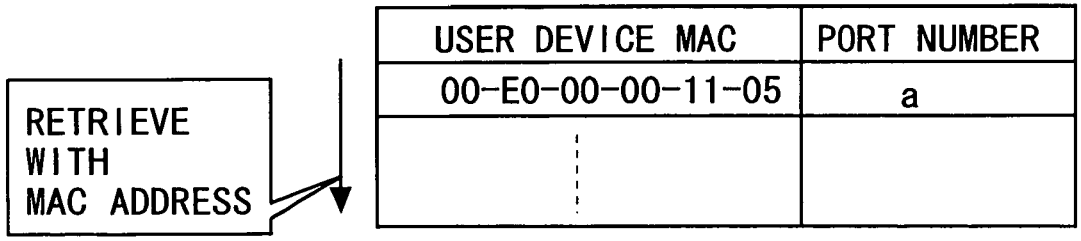
FIG. 24 is a view showing the MAC address learning table.
Figure 25:
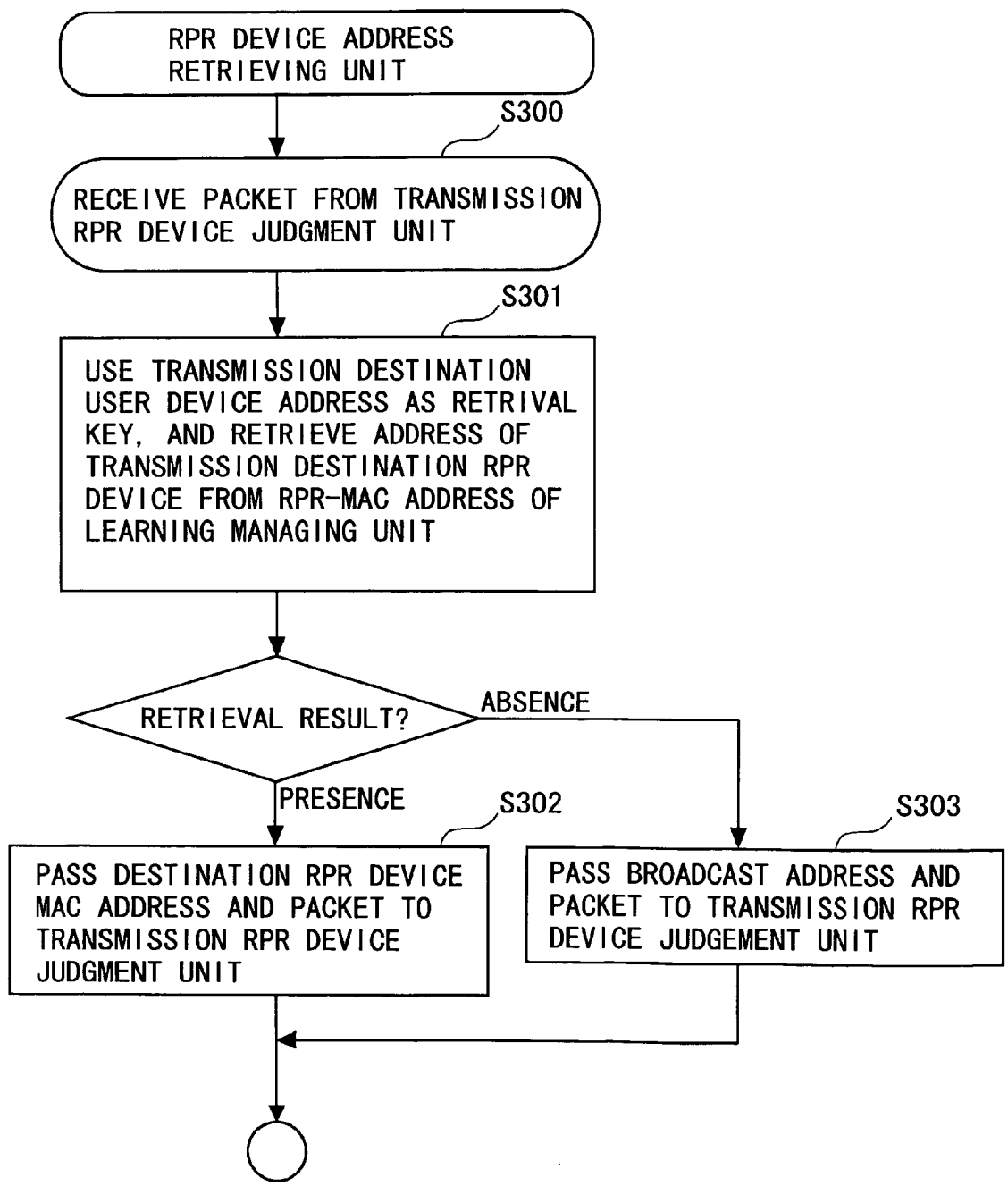
FIG. 25 is a flowchart showing a process of an RPR device address retrieving unit according to the embodiment.
Figures 26, 27:
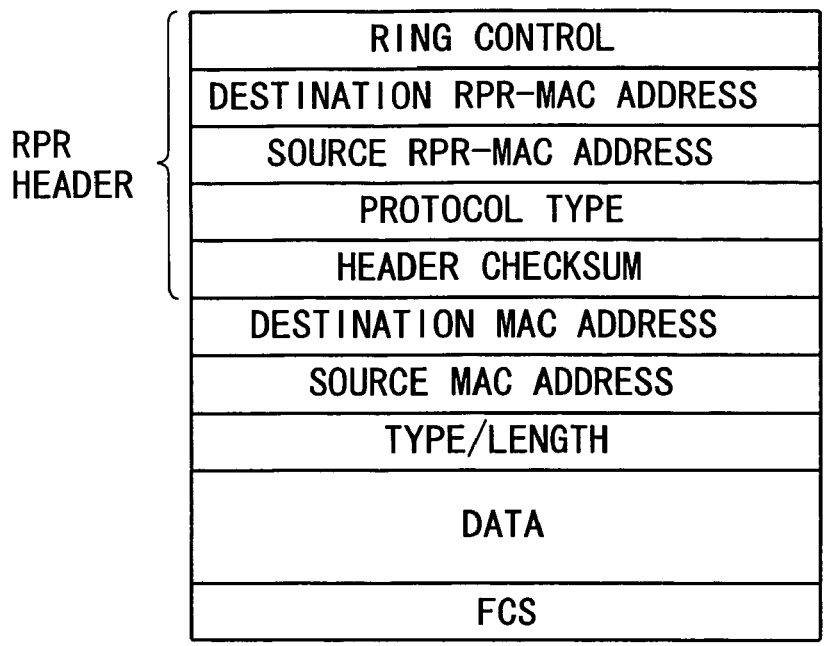
FIG. 26 is a format explaining view of an RPR data packet (ARP response) according to the embodiment.
FIG. 27 is an explaining view of set information of the RPR data packet (ARP response) shown in FIG. 26.

Also, FIG. 20 is a flowchart showing a process of an RPR device address/user device address learning managing unit in the embodiment. FIG. 21 is a view showing an RPR-MAC address learning table in each of the RPR devices 5 and 6. FIG. 22 is a format explaining view of an ARP response packet in the embodiment. FIG. 23 is an explaining view of the set information of the ARP response packet in the embodiment. FIG. 24 is a view showing the MAC address learning table of the RPR device 6. FIG. 25 is a flowchart showing a process of an RPR device address retrieving unit in the embodiment. FIG. 26 is a format explaining view of an RPR data packet (ARP response) in the embodiment. FIG. 27 is an explaining view of the set information of the RPR data packet (ARP response) in the embodiment. FIG. 28 is a view showing the RPR-MAC address learning table after the RPR device 5 is updated. FIG. 29 is a view showing the RPR-MAC address learning table of the RPR device 4.

Figure 30:
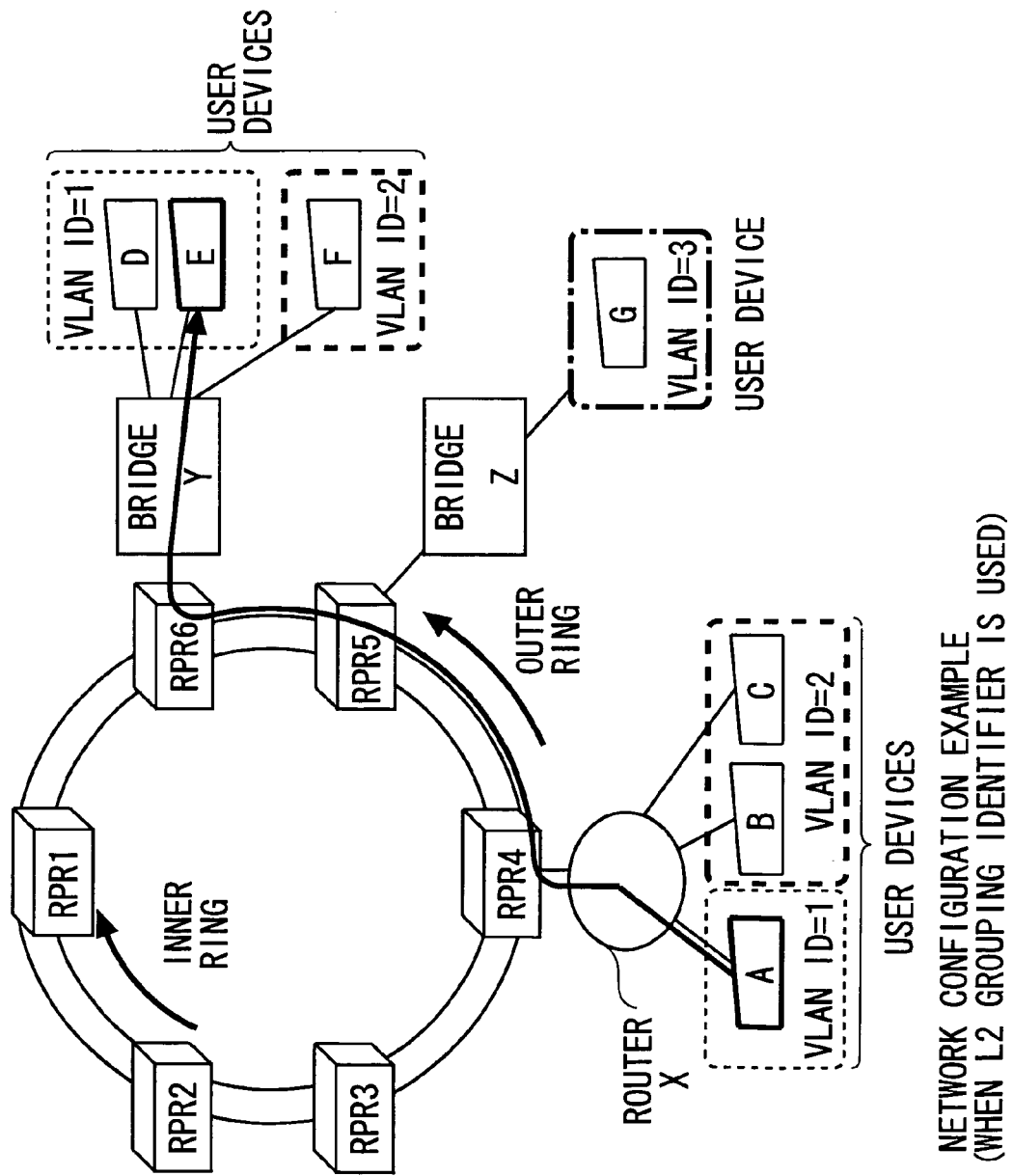
FIG. 30 is a view showing a network configuration example (when the L2 grouping identifier is used) according to the embodiment.
Figure 31:
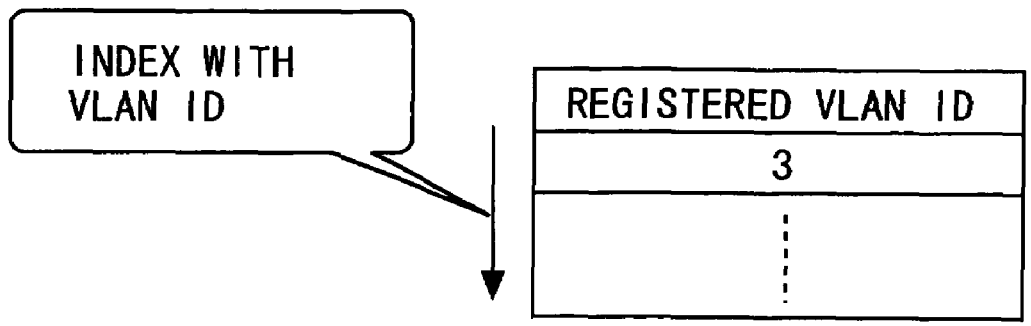
FIG. 31 is a view showing a VLAN ID registration table.
Figure 32:
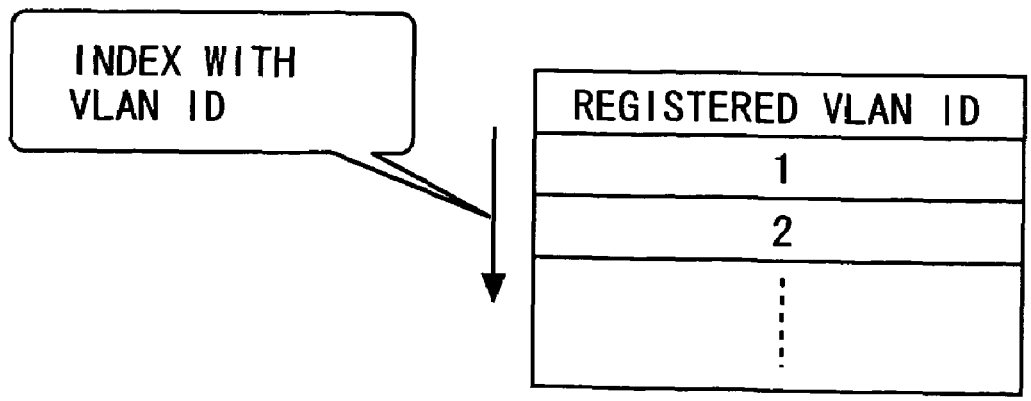
FIG. 32 is a view showing a VLAN ID registration table.
Figure 37:
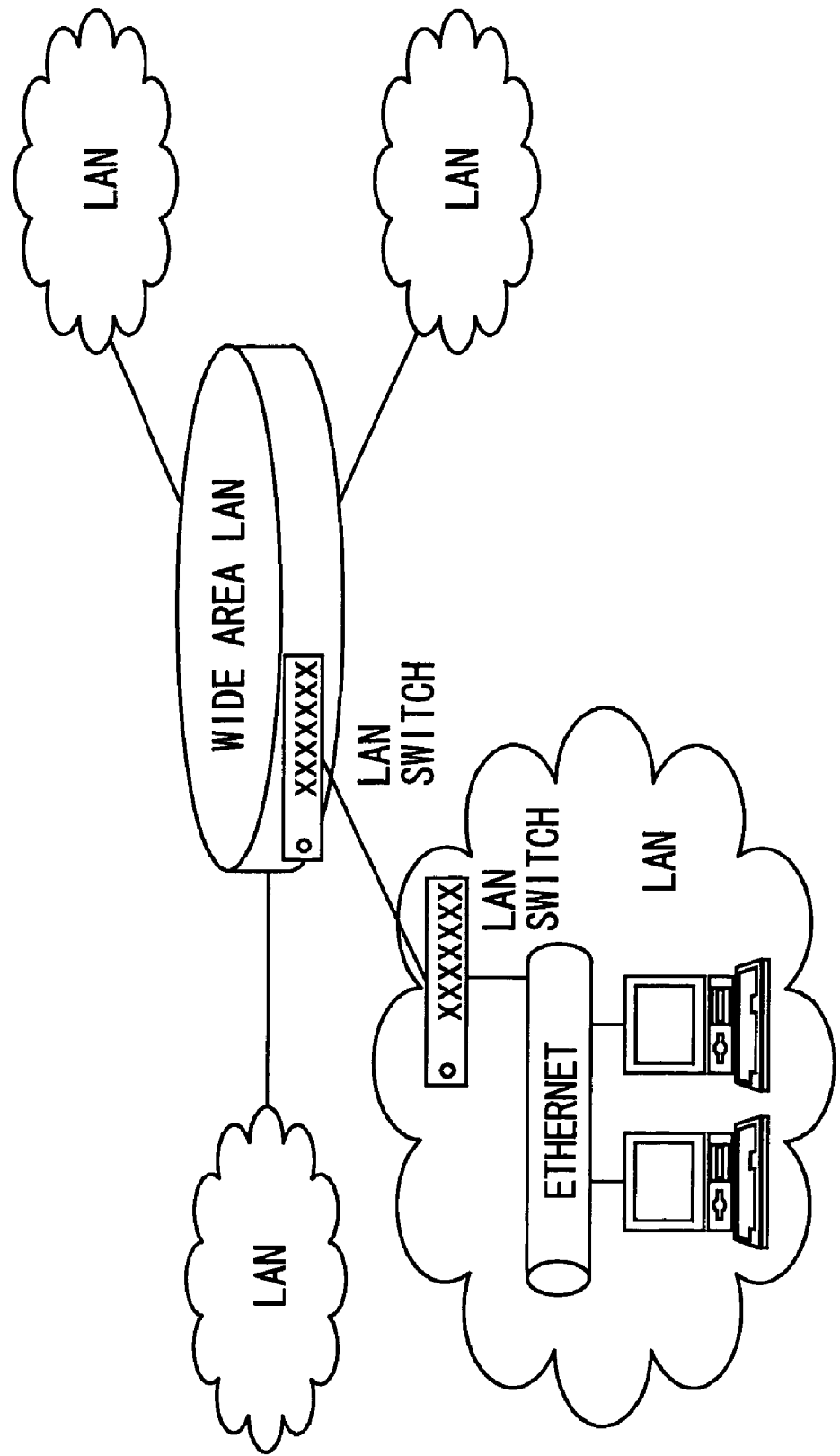
FIG. 37 is a view showing a network configuration of a wide area LAN service.

Also, FIG. 30 is a view showing one network configuration example (when the L2 grouping identifier is used) in the embodiment. FIG. 31 is a view showing a VLAN ID registration table of the RPR device 5. FIG. 32 is a view showing a VLAN ID registration table of the RPR device 6. FIG. 33 is a format explaining view of an ARP request packet (when the L2 grouping identifier is used) in the embodiment. FIG. 34 is an explaining view of the set information of the ARP request packet (when the L2 grouping identifier is used) in the embodiment. FIG. 35 is a format explaining view of an RPR data packet (when the L2 grouping identifier is used) in the embodiment. FIG. 36 is an explaining view of the set information of the RPR data packet (when the L2 grouping identifier is used) in the embodiment.

FIG. 6 shows the network configuration example in the embodiment. In this embodiment, the case where the packet is transmitted and received between a user device A and a user device E in FIG. 6 is explained.

In the RPR device, both of an L2 device and an L3 device can be connected as the user devices. For this reason, FIG. 6 shows the router X connected to the RPR device 4 and a bridge Z connected to the RPR device 5 and a bridge Y connected to the RPR device 6, as the example of the user device.

Also, any kind of traffic that can be transmitted in the present invention may be used with no particular limitations as long as the RPR can transmit it, and it is not especially limited. However, this embodiment employs an IP traffic.

FIG. 7 shows the network configuration under the administration of the RPR device 4. The RPR device 4 has a MAC address "00-E0-00-24-04" and includes the router X in its accommodation port (port "a"). The router X has a MAC address "00-E0-00-33-01".

Also, the router X includes the user devices A to C. Each of the user devices A to C is, for example, an IP terminal. The user device A has a MAC address "00-E0-00-11-01", the user device B has a MAC address "00-E0-00-00-11-02", and the user device C has a MAC address "00-E0-00-00-11-03".

FIG. 8 shows the network configuration under the administration of the RPR device 5. The RPR device 5 has a MAC address "00-E0-00-00-22-05" and includes the bridge Z in its accommodation port (port "a"). The user device (for example, the IP terminal) G is connected to the bridge Z. The user device F has a MAC address "00-E0-00-00-11-07".

FIG. 9 shows the network configuration under the administration of the RPR device 6. The RPR device 6 has a MAC address "00-E0-00-00-22-06" and includes the bridge Y in its accommodation port (port "a"). The user devices D to F are connected as the user device (for example, the IP terminal) to the bridge Y.

The user device D has a MAC address "00-E0-00-00-11-04", the user device E has a MAC address "00-E0-00-00-11-05", and the user device F has a MAC address "00-E0-00-00-11-06".

FIRST OPERATION EXAMPLE

Case of Using No L2 Grouping Identifier

At first, as the first operation example in the embodiment, the operations of the respective RPR devices 1 to 6 until the time when the user device E receives the packet transmitted by the user device A as shown in FIG. 6 are explained with regard to the case of using no L2 grouping identifier. Among the respective RPR devices 1 to 6, at least the RPR devices 4, 5, and 6 have the configurations and functions shown in FIG. 2.

Each of the RPR devices 1 to 6 on the ring network learns the connection configuration inside the ring by using the topology detection function that is the existing RPR technique. Each of the RPR devices 1 to 6 broadcast-transmits the topology detection message, in order to perform the topology detection on the inner ring and the outer ring. The topology detection message has the format shown in FIG. 10. The RPR header of the topology detection message at this time has the set value shown in FIG. 11.

For example, the topology detection message transmitted from the RPR device 1 is received by each of the RPR devices 1 to 6, and the ring topology information is recognized. Each of the RPR devices 1 to 6, when receiving the topology detection message, compares the transmission source RPR-MAC address with the MAC address of the self-RPR device.

The RPR device 1 of the transmission source judges that the topology detection message makes a round of the ring, because the transmission source RPR-MAC address and the MAC address of the self-RPR device are coincident. The same applies to the remaining RPR devices 2 to 5.

The topology detection message is periodically transmitted. One RPR device, when receiving the topology detection message having the similar ring topology information continuously two times, creates a topology map.

After that, when the change occurs in the topology, each RPR device updates the topology map if receiving the topology detection message having the ring topology information after the topology change, continuously two times. In this way, the topology maps of the inner and outer rings are created in each of the RPR devices 1 to 6.

The user device A, when transmitting the packet to the user device E, recognizes that an IP address (known) of the user device E is outside the subnet to which it belongs. In this case, the user device A transmits the ARP request packet into the subnet to which it belongs, in order to recognize the MAC address of the router X which is a gateway to a different subnet.

The router X, when receiving the ARP request packet, transmits the ARP response packet including its MAC address to the user device A.

The user device A, when receiving the ARP response packet, recognizes a MAC address=00-E0-00-33-01 of the router X that becomes the destination MAC address of the packet. The user device A, when recognizing the destination MAC address (the MAC address of the router X), transmits the data packet to the router X, in order to transmit the packet to the user device E.

The router X transmits the ARP request packet into the subnet to which the user device E belongs, in order to recognize the MAC address of the user device E from the destination IP address in the data packet. FIG. 12 shows a packet format of the ARP request packet transmitted from the router X, and FIG. 13 shows the set value of the MAC header of the ARP request packet.

As shown in FIG. 13, the destination MAC address is set for the broadcast (FF-FF-FF-FF-FF-FF). As the transmission source MAC address, the MAC address of the router X is set. As a type, "ARP request" is set.

In the RPR device 4, the ARP request packet from the router X is received at the port "a." The reception user data judgment unit 14 of the RPR device 4 passes the ARP request packet to the user address learning unit 15.

The user address learning unit 15 learns the correspondence between the MAC address=00-E0-00-00-33-01 of the router X judged by the reception user data judgment unit 14 and the port "a" receiving the ARP request packet, and creates a MAC learning table, as shown in FIG. 14, on the user device address/accommodation position learning table 21.

The reception user data judgment unit 14 passes the ARP request packet to the transmission RPR device judgment unit 12 after the MAC address learning of the user address learning unit 15.

The transmission RPR device judgment unit 12, when receiving the ARP request packet from the reception user data judgment unit 14, executes the process shown in FIG. 15. Here, FIG. 15 is used to explain the processing flow of the transmission RPR device judgment unit 12. The transmission RPR device judgment unit 12, when receiving the packet (Step S00), judges whether or not the destination MAC address of the packet is the broadcast address (Step S01).

At this time, the transmission RPR device judgment unit 12, if it is the broadcast address (S01; YES), obtains the broadcast address as the destination RPR device MAC address (Step S02), and if it is not the broadcast address (S01; NO), passes the packet to the RPR device address retrieving unit 13 and receives the destination RPR device MAC address from the RPR device address retrieving unit 13.

Then, the transmission RPR device judgment unit 12 adds the RPR header including the destination RPR device MAC address obtained at the step S02 or S03 to the packet, and passes to the transmission ring selector 11 (Step S04).

When the processing flow shown in FIG. 15 is applied to the process for the ARP request packet from the router X (corresponding to the user device), the following is derived. That is, the transmission RPR device judgment unit 12 judges whether or not the destination MAC address of the ARP request packet is the broadcast address (S01).

Here, the destination MAC address of the ARP request packet is the broadcast address=FF-FF-FF-FF-FF-FF (refer to FIGS. 16 and 17). For this reason, the transmission RPR device judgment unit 12 obtains the broadcast address as the destination RPR device MAC address (S02), adds the RPR header, in which the destination RPR device MAC address is set for the broadcast address, to the ARP request packet, and passes to the transmission ring selector 11 (S04).

The RPR data packet including the ARP request passed from the transmission RPR device judgment unit 12 to the transmission ring selector 11 has the format shown in FIG. 16. The RPR header of this RPR data packet has a set value shown in FIG. 17.

The transmission ring selector 11 selects any one of the inner and outer rings to which the RPR data packet is transmitted, from the information of the RPR header. Here, the outer ring is used to transmit the RPR data packet to the RPR device 5 which is the adjacent RPR device.

The operations of the RPR device 5 receiving the RPR data packet (FIGS. 16 and 17) from the RPR device 4 will be described below. When the RPR device 5 receives the RPR data packet from the RPR device 4, the reception data judgment unit 16 of the RPR device 5 executes the processing flow shown in FIGS. 18A and 18B.

Here, the processing flows shown in FIGS. 18A and 18B are explained. The reception data judgment unit 16, when receiving the RPR data packet from the adjacent RPR device (Step S000), judges whether or not a VLAN tag (VLAN Tag) is added to the RPR data packet.

At this time, if the VLAN tag is added (S001; YES), the process proceeds to a step S002, and if it is not added (S001; NO), the process proceeds to a step S004.

At the step S002, the reception data judgment unit 16 indexes a VLAN-ID table (managed by the RPR device address/user device address learning managing unit 20) by using VLAN-ID in the VLAN tag of the RPR data packet, and judges whether or not this VLAN-ID is registered as the VLAN-ID of the self-node (the RPR device itself).

At this time, if the VLAN-ID is registered (S002; YES), the process proceeds to a step S004, and if it is not registered (S002; NO), the process proceeds to a step S003.

At the step S003, the reception data judgment unit 16 passes the RPR data packet to the transmission ring selector 11 and then ends the processing flow.

At the step S004, the reception data judgment unit 16 judges the destination MAC address of the RPR header (the RPR device MAC address). At this time, if the destination MAC address is the MAC address of the self-node (S004; self-node), the process proceeds to a step S005, and if it is the broadcast address (S004; broadcast) the process proceeds to a step S007, and if it is a different address (S004; others), the process proceeds to a step S011.

At the step S005, the reception data judgment unit 16 passes the RPR data packet to the RPR device address learning unit 17, and the process proceeds to a step S006. Passing through the step S005, the RPR device address learning unit 17 learns the correspondence between the transmission source MAC address of the RPR header and the transmission source MAC address of the packet (which will be described later).

At the step S006, the reception data judgment unit 16 passes the RPR data packet to the transmission position judgment unit 18 and ends the processing flow.

At a step S007, the reception data judgment unit 16 judges whether or not the transmission source MAC address of the RPR header is the MAC address of the self-node. At this time, if the transmission source MAC address is the MAC address of the self-node (S007; YES), the process proceeds to a step S010, and if it is not the objective one (S007; NO), the process proceeds to a step S008.

At the step S008, the reception data judgment unit 16 passes the RPR data packet to the RPR device address learning unit 17, and the process proceeds to a step S009. Passing through the step S008, the RPR device address learning unit 17 learns the correspondence between the transmission source MAC address of the RPR header and the transmission source MAC address of the packet (which will be described later).

At the step S009, the reception data judgment unit 16 passes the RPR data packet to the transmission position judgment unit 18 and the transmission ring selector 11 and ends the processing flow.

At the step S010, the reception data judgment unit 16 discards the RPR data packet because this is transmitted from itself, and ends the processing flow.

At a step S011, the reception data judgment unit 16 passes the RPR data packet to the RPR device address learning unit 17, and the process proceeds to a step S012. Passing through the step S011, the RPR device address learning unit 17 learns the correspondence between the transmission source MAC address of the RPR header and the transmission source MAC address of the packet (which will be described later).

At the step S012, the reception data judgment unit 16 passes the RPR data packet to the transmission ring selector 11 and ends the processing flow.

When the processing flows shown in FIGS. 18A and 18B are applied to the process for the RPR data packet from the RPR device 4, the following is obtained. That is, the reception data judgment unit 16 of the RPR device 5 judges the presence or absence of the VLAN tag (S001).

At this time, the VLAN tag is not added to the RPR data packet (FIG. 16). Thus, the reception data judgment unit 16 judges the destination MAC address of the RPR header (S004).

The destination MAC address of the RPR header is the broadcast address=FF-FF-FF-FF-FF-FF. Thus, the reception data judgment unit 16 judges whether or not the transmission source MAC address of the RPR header is the MAC address of the self-node (S007).

At this time, the transmission source MAC address of the RPR header is "00-E0-00-00-22-04," which is different from the self-node MAC address (FIG. 8). Thus, the reception data judgment unit 16 passes the RPR data packet to the RPR device address learning unit 17 (S008) and further passes even to the transmission position judgment unit 18 and the transmission ring selector 11 (S009).

At the step S008, since the RPR data packet is passed to the RPR device address learning unit 17, the RPR device address learning unit 17 executes the processing flow shown in FIG. 19.

Here, FIG. 19 is referenced to explain the processing flow of the RPR device address learning unit 17. The processing flow shown in FIG. 19 is executed by executing the steps S005 and S011 shown in FIG. 18A.

The RPR device address learning unit 17, when receiving the RPR data packet from the reception data judgment unit 16 (Step S100), extracts the transmission source MAC address as a transmission source user device address from the RPR data packet, uses this transmission source MAC address as the retrieval key, and judges whether or not the transmission source user device address coincident with the retrieval key is learned (registered) in the RPR-MAC address learning table 20A of the RPR device address/user device address learning managing unit 20(Step S101).

At this time, if the transmission source user device address is registered (S101; already learned), the process proceeds to a step S103, and if it is not registered (S101; not learned), the process proceeds to a step S102.

At the step S102, the RPR device address learning unit 17 notifies the RPR device address/user device address learning managing unit 20 of the transmission source user device address of the RPR data packet (the transmission source MAC address) and the transmission source RPR device address of the RPR header (the RPR-MAC address), and the process proceeds to a step S103.

At the step S103, the RPR device address learning unit 17 passes (returns) the RPR data packet to the reception data judgment unit 16 and ends the processing flow.

At the step S102, since the transmission source MAC address and the transmission source RPR-MAC address are notified to the RPR device address/user device address learning managing unit 20, the processing flow of the RPR device address/user device address learning managing unit 20 as shown in FIG. 20 is started (Step S200).

Then, the RPR device address/user device address learning managing unit 20 correlates the notified transmission source MAC address and transmission source RPR-MAC address to be registered in the RPR-MAC address learning table 20A managed therein (Step S201) and ends the processing flow.

When the processing flows shown in FIGS. 19 and 20 as described above are applied to the RPR data packet (FIGS. 16 and 17) including the ARP request packet from the RPR device I, the following is obtained.

The RPR device address learning unit 17 uses the transmission source MAC address of the ARP request packet (the MAC address=00-E0-00-00-33-01 of the router X) as the retrieval key, and judges whether or not the transmission source user device address (the MAC address of the router X) is learned in the RPR-MAC address learning table 20A of the RPR device address/user device address learning managing unit 20 (S101).

At this time, the transmission source MAC address of the ARP request packet is not learned (S101; not learned). Thus, the RPR device address learning unit 17 learns the correspondence between the transmission source RPR-MAC address of the RPR header (the MAC address=00-E0-00-00-22-04 of the RPR device I) from the RPR data packet and the transmission source MAC address of the ARP request packet (the MAC address=00-E0-00-00-33-01 of the router X), and notifies the RPR device address/user device address learning managing unit 20 of those addresses (S102).

Then, the RPR device address/user device address learning managing unit 20 registration unit s the correspondence of the notified addresses in the RPR-MAC address learning table 20A (S201: refer to FIG. 21).

After that, the RPR data packet is passed to the RPR device address learning unit 17, and the reception data judgment unit 16 passes the RPR data packet to the transmission ring selector 11 and the transmission position judgment unit 18 (S009).

The transmission position judgment unit 18, when receiving the RPR data packet, removes the RPR header, and in accordance with the destination MAC address "FF-FF-FF-FF-FF-FF" of the ARP request packet, broadcast-transmits the ARP request packet to the user device G (FIG. 6) under the administration of the RPR device 5.

On the other hand, the transmission ring selector 11 having received the RPR data packet from the reception data judgment unit 16 selects any one of the inner and outer rings to which the RPR data packet is transmitted, from the information of the RPR header. Here, the outer ring is used to transmit the RPR data packet to the RPR device 6, which is the adjacent RPR device.

As mentioned above, the RPR device 5 can learn the correspondence between the transmission source MAC address of the RPR header (the transmission source RPR-MAC address) from the RPR data packet received from the RPR device 4 and the transmission source MAC address of the packet.

The operations of the RPR device 6 having received the RPR data packet (FIGS. 16 and 17) from the RPR device 5 shown in FIG. 6 will be described below. The RPR device 6, when receiving the RPR data packet from the RPR device 5, carries out the operations similar to the RPR device 5.

That is, the reception data judgment unit 16 of the RPR device 6 judges the presence or absence of the VLAN tag (FIG. 18A; S001) and judges the destination MAC address of the RPR header (FIG. 18A; S004). At this time, the destination MAC address of the RPR header is the broadcast address (=FF-FF-FF-FF-FF-FF).

Thus, the reception data judgment unit 16 judges whether or not the transmission source MAC address of the RPR header is the MAC address of the self-node (the RPR device 6) (FIG. 18B; S007). At this time, the transmission source MAC address is different from the self-node MAC address. Hence, the reception data judgment unit 16 passes the RPR data packet to the RPR device address learning unit 17 (FIG. 18B; S008).

The RPR device address learning unit 17 learns the correspondence between the transmission source MAC address of the RPR header and the transmission source MAC address of the ARP request packet (FIG. 19; S101, S102). The RPR device address/user device address learning managing unit 20 creates the RPR-MAC address learning table 20A as shown in FIG. 21 (FIG. 20; S201).

The RPR data packet is passed to the reception data judgment unit 16 (FIG. 19; S103) after the RPR-MAC address learning table 20A is created, and passed to the transmission ring selector 11 and the transmission position judge (FIG. 18B; S009).

The transmission ring selector 11, when receiving the RPR data packet, carries out the operations similar to the transmission ring selector 11 of the RPR device 5, and transmits the RPR data packet to the ring.

On the other hand, the transmission position judgment unit 18 having received the RPR data packet from the reception data judgment unit 16 removes the RPR header, and in accordance with the destination MAC address "FF-FF-FF-FF-FF-FF" of the ARP request packet, broadcast-transmits the ARP packet to the user device under the administration of the RPR device 6.

As shown in FIGS. 6 and 9, the RPR device 6 includes the user devices D, E, and F including the user device E corresponding to the destination of the ARP request packet, as the user device under the administration thereof, through the bridge Y. The ARP request packet arrives at each of the user devices D, E, and F because of the broadcast transmission. In this way, the ARP request packet transmitted from the router X is received by the user device E.

The user device E having received the ARP request packet, since the destination IP address of the ARP request packet is addressed to itself, transmits the ARP response packet including its MAC address to the router X. FIG. 22 shows a format of the ARP response packet in this case, and FIG. 23 shows the set value of the MAC header of the ARP response packet.

In the RPR device 6, the ARP response packet transmitted from the user device E is received through the bridge Y at the port "a." The reception user data judgment unit 14 of the RPR device 6 passes the ARP response packet to the user address learning unit 15.

The user address learning unit 15 learns the correspondence between the MAC address (=00-E0-00-00-11-05) of the user device E judged by the reception user data judgment unit 14 and the port "a" receiving the ARP response packet, and creates the MAC learning table as shown in FIG. 24 inside the user device address/accommodation position learning table 21.

The reception user data judgment unit 14 passes the ARP response packet to the transmission RPR device judgment unit 12 after the address learning of the user address learning unit 15.

The transmission RPR device judgment unit 12 having received the ARP response packet from the reception user data judgment unit 14 judges whether or not the destination MAC address of the ARP response packet is the broadcast address, in accordance with the processing flow of FIG. 15 (S01).

The destination MAC address of the ARP response packet is "00-E0-00-00-33-01" (FIG. 23), and it is not the broadcast address. Thus, the transmission RPR device judgment unit 12 passes the ARP response packet to the RPR device address retrieving unit 13 (S03).

The RPR device address retrieving unit 13 having received the ARP response packet executes the processing flow shown in FIG. 25. Here, FIG. 25 is referenced to explain the processing flow of the RPR device address retrieving unit 13.

The RPR device address retrieving unit 13, when receiving the packet from the transmission RPR device judgment unit 12 (Step S300), starts the processing flow. The RPR device address retrieving unit 13 uses the transmission destination user device address as the retrieval key and retrieves the address of the transmission destination RPR device from the RPR-MAC address learning table 20A of the RPR device address/user device address learning managing unit 20 (Step S301).

That is, the RPR device address retrieving unit 13 uses the transmission destination MAC address of the packet as the retrieval key, retrieves the RPR-MAC address learning table 20A, and retrieves the RPR device MAC address corresponding to the MAC address as the retrieval key.

At this time, if the corresponding RPR device MAC address is registered (already learned: S301; YES), the process proceeds to a step S302. If it is not registered (not learned: S301; NO), the process proceeds to a step S303.

In the step S302, the RPR device address retrieving unit 13 passes the RPR device MAC address retrieved from the RPR-MAC address learning table 20A and the packet to the transmission RPR device judgment unit 12, and ends the processing flow.

At the step S303, the RPR device address retrieving unit 13 passes the broadcast address and the packet to the transmission RPR device judgment unit 12, and ends the processing flow.

When the processing flow shown in FIG. 25 is applied to the RPR device address retrieving unit 13 of the RPR device 6, the following is obtained. The RPR device address retrieving unit 13 uses the destination MAC address (=00-E0-00-00-33-01) of the ARP response packet as the retrieval key, and retrieves the MAC address of the transmission destination RPR device from the RPR-MAC address learning table 20A shown in FIG. 21 (S301).

At this time, the RPR device address retrieving unit 13 can obtain the MAC address of the transmission destination RPR device (the MAC address=00-E0-00-00-22-04 of the RPR device 4) as the retrieval result, from the RPR-MAC address learning table 20A. Then, the RPR device address retrieving unit 13 passes the destination RPR device MAC address of the retrieval result and the ARP response packet to the transmission RPR device judgment unit 12 (S302).

The transmission RPR device judgment unit 12 adds the RPR header to the ARP response packet, generates the RPR data packet, and passes the packet to the transmission ring selector 11. FIG. 26 shows the format of the RPR data packet in this case, and FIG. 27 shows the set value of the RPR header of the RPR data packet.

The transmission ring selector 11 selects any one of the inner and outer rings to which the RPR data packet is transmitted, from the information of the RPR header. Here, the transmission ring selector 11 uses the inner ring to transmit the RPR data packet to the RPR device 5 which is the adjacent RPR device.

With the above-mentioned operations, the RPR device 6 can retrieve the transmission destination RPR device MAC address (the MAC address of the RPR device 4 including the router X) in accordance with the destination MAC address of the ARP response packet from the user device E (the MAC address of the router X), and adds this transmission destination RPR device MAC address to the RPR header, and then transmit to the ring network.

The operations of the RPR device 5 (FIGS. 6 and 8) having received the RPR data packet from the RPR device 6 will be described below. When the RPR device 5 receives the RPR data packet from the RPR device 6, the reception data judgment unit 16 of the RPR device 5 executes the processing flow shown in FIGS. 18A and 18B.

That is, the reception data judgment unit 16 judges the presence or absence of the VLAN tag (S001). As shown in FIG. 26, the VLAN tag is not added to the RPR data packet. Thus, the reception data judgment unit 16 judges the destination MAC address of the RPR header (S004)

The destination MAC address (=00-E0-00-00-22-04) of the RPR header is neither the self-node address, nor the broadcast address. Thus, the reception data judgment unit 16 passes the RPR data packet to the RPR device address learning unit 17 (S011).

Then, the RPR device address learning unit 17 starts the processing flow shown in FIG. 19. The RPR device address learning unit 17 uses the transmission source MAC address (=00-E0-00-00-11-05) of the ARP response packet as the retrieval key, refers to the RPR-MAC address learning table 20A of the RPR device address/user device address learning managing unit 20, and judges whether or not the transmission source user device address coincident with the retrieval key is learned (S101).

Here, since the transmission source user device address is not learned, the RPR device address learning unit 17 notifies the transmission source MAC address (=00-E0-00-00-22-06) of the RPR header from the RPR data packet and the transmission source MAC address (00-E0-00-00-11-05) of the ARP response packet.

Then, the RPR device address/user device address learning managing unit 20 registration unit s the transmission source RPR device MAC address and the transmission source MAC address in the RPR-MAC address learning table 20A, in accordance with the processing flow of FIG. 20 (S201).

Thus, the RPR-MAC address learning table 20A of the RPR device 5 is updated to create the RPR-MAC address learning table 20A as shown in FIG. 28.

The RPR device address learning unit 17, after creating (updating) the RPR-MAC address learning table 20A, passes the RPR data packet to the reception data judgment unit 16 (FIG. 19; S103). The reception data judgment unit 16 passes the RPR data packet to the transmission ring selector 11 without passing to the transmission position judgment unit 18 (FIG. 18A; S012).

The transmission ring selector 11, when receiving the RPR data packet from the reception data judgment unit 16, selects any one of the inner and outer rings to which the RPR data packet is transmitted, from the information of the RPR header. Here, the transmission ring selector 11 uses the inner ring to transmit the RPR data packet to the RPR device 4 which is the adjacent RPR device.

The operations of the RPR device 4 having received the RPR data packet (FIGS. 26 and 27) from the RPR device 5 will be described below. When the RPR device 4 receives the RPR data packet from the RPR device 5, the reception data judgment unit 16 of the RPR device 4 starts the execution of the processing flow shown in FIGS. 18A and 18B.

That is, the reception data judgment unit 16 judges the presence or absence of the VLAN tag, and the destination MAC address of the RPR header. The destination MAC address (=00-E0-00-00-22-04) of the RPR header is coincident with the self-node MAC address (FIG. 7). Thus, the reception data judgment unit 16 passes the RPR data packet to the RPR device address learning unit 17.

Then, the RPR device address learning unit 17 starts the processing flow shown in FIG. 19 and learns the correspondence between the transmission source MAC address of the RPR header and the transmission source MAC address of the ARP response packet. The RPR device address/user device address learning managing unit 20 creates the RPR-MAC address learning table 20A shown in FIG. 29, in accordance with the processing flow of FIG. 20. After that, the RPR data packet is passed to the reception data judgment unit 16. The reception data judgment unit 16 passes the RPR data packet to the transmission position judgment unit 18.

The transmission position judgment unit 18 having received the RPR data packet from the reception data judgment unit 16 removes the RPR header, and in linkage with the user address retrieving unit 19, uses the destination MAC address (=00-E0-00-00-33-01) of the ARP response packet as the retrieval key, and retrieves the MAC address learning table shown in FIG. 14, and then transmits the ARP response packet to the port "a" obtained as the retrieval result.

As mentioned above, the ARP response packet transmitted from the user device E is received by the router X.

The router X having received the ARP response packet can transmit the data packet received from the user device A, to the user device E. Hereafter, each RPR device can transmit and receive the packet without transmitting the broadcast packet between the user device A and the user device E in accordance with the learning content.

As explained above, according to the embodiment, the transmission/reception of the data packet can be performed without using the routing protocol of the L3 function.

SECOND OPERATION EXAMPLE

Case of Using L2 Grouping Identifier

As a second operation example in the embodiment, the operations of each of the RPR devices 1 to 6 until the packet transmitted from the user device A (FIGS. 6 and 7) is received by the user device E (FIGS. 6 and 9) will be described below with regard to the case of using the L2 grouping identifier.

Among the respective RPR devices 1 to 6, at least the RPR devices 4, 5, and 6 have the configurations and functions shown in FIG. 2. Also, as the example of the L2 grouping identifier, the VLAN tag is used.

FIG. 30 shows the example when the VLAN is applied to the network shown in FIG. 6. In FIG. 30, VLAN ID (also noted as "VLAN-ID")=1 as the L2 grouping identifier is assigned to the user devices A, D, and E. Also, VLAN-ID=2 is assigned to the user devices B, C, and F. Also, VLAN-ID=3 is assigned to the user device G.

Also, it is assumed that each RPR device recognizes the VLAN-ID of the user device under the administration of the self-node through provisioning and stores the information. In each RPR device, the VLAN-ID of each user device is stored in a VLAN-ID registration table (refer to FIGS. 31 and 32) managed, for example, by the RPR device address/user device address learning managing unit 20, and the reception data judgment unit 16 can refer to it. However, the VLAN-ID registration table can be managed at a proper position in the RPR device other than the RPR device address/user device address learning managing unit 20.

The operations until the user device A transmits the data packet to the router X after each of the RPR devices 1 to 6 shown in FIG. 30 creates the topology map are similar to the above-mentioned first operation example. Thus, the explanations are omitted.

The router X, when receiving the data packet from the user device A, transmits the ARP request packet towards the subnet to which the user device E belongs, in order to know the MAC address of the user device E. The ARP request packet in this case has a format shown in FIG. 33, and the set value of the MAC header of the ARP packet has a value as shown in FIG. 34.

In the RPR device 4, the ARP request packet from the router X is received at the port "a." The reception user data judgment unit 14 of the RPR device 4 passes the ARP request packet to the user address learning unit 15. Since the operation of creating the MAC address learning table in the user address learning unit 15 is similar to the first operation example, it is omitted. The reception user data judgment unit 14 passes the ARP request packet to the transmission RPR device judgment unit 12, after the execution of the MAC address learning.

The transmission RPR device judgment unit judges whether or not the destination MAC address of the ARP request packet is the broadcast address. Here, the transmission RPR device judgment unit 12 adds the RPR header, in which the destination RPR device MAC address is set for the broadcast address, and creates the RPR data packet, and then passes the packet to the transmission ring selector 11.

The RPR data packet in this case has the format shown in FIG. 35, and the set value shown in FIG. 36 is set for the RPR header of this RPR data packet.

The transmission ring selector 11 selects any one of the inner and outer rings to which the RPR data packet is transmitted, from the information of the RPR header. Here, the outer ring is used to transmit the RPR data packet to the RPR device 5 which is the adjacent RPR device.

The operations of the RPR device 5 having received the RPR data packet (FIGS. 35 and 36) from the RPR device 4 will be described below. When the RPR device 5 receives the RPR data packet from the RPR device 4, the reception data judgment unit 16 of the RPR device 5 starts the processing flow shown in FIGS. 18A and 18B and judges the presence or absence of the RPR data packet VLAN tag (S001).

At this time, the VLAN tag is added to the RPR data packet (FIGS. 35 and 36). Thus, the reception data judgment unit 16 indexes the VLAN-ID registration table shown in FIG. 31 with VLAN-ID=1 in the VLAN tag. At this time, VLAN-ID=1 is not registered.

Thus, the reception data judgment unit 16 passes the RPR data packet to the transmission ring selector 11 without making the RPR device address learning unit 17 learn the correspondence between the transmission source RPR device address and the transmission source user device address (FIG. 18A; S003).

The transmission ring selector 11 having received the RPR data packet from the reception data judgment unit 16 selects any one of the inner and outer rings to which the packet is transmitted, from the information of the RPR header. Here, the transmission ring selector 11 selects the outer ring to transmit the RPR data packet to the RPR device 6 corresponding to the adjacent RPR device.

The operations of the RPR device 6 having received the RPR data packet from the RPR device 5 will be described below. When the RPR device 6 receives the RPR data packet from the RPR device 5, the reception data judgment unit 16 of the RPR device 6 starts the processing flow shown in FIGS. 18A and 18B.

The reception data judgment unit 16 judges whether or not the VLAN tag is included in the RPR data packet (S001). Here, since the VLAN tag is included, the reception data judgment unit 16 extracts the VLAN tag=1 set for the VLAN tag, and indexes the VLAN-ID registration table (registering the content shown in FIG. 32) managed by the RPR device address/user device address learning managing unit 20 with VLAN-ID=1, and then judges whether or not VLAN-ID=1 is registered (S002).

At this time, VLAN-ID=1 is registered in the VLAN-ID registration table. Thus, the reception data judgment unit 16 judges the destination MAC address of the RPR header (S004).

Here, the destination MAC address of the RPR header is the broadcast address (=FF-FF-FF-FF-FF-FF). Thus, the reception data judgment unit 16 judges whether or not the transmission source MAC address of the RPR header is the MAC address of the self-node. The transmission source MAC address is different from the self-node MAC address. Thus, the reception data judgment unit 16 passes the RPR data packet to the RPR device address learning unit 17.

The RPR device address learning unit 17, when receiving the RPR data packet, starts the processing flow shown in FIG. 19, and learns the correspondence between the transmission source MAC address of the RPR header and the transmission source MAC address of the ARP request packet. The RPR device address/user device address learning managing unit 20 creates the RPR-MAC address learning table 20A having the registration content shown in FIG. 21 (registration unit s the correspondence between the RPR-MAC address and the MAC address) in accordance with the processing flow shown in FIG. 20.

The RPR data packet is passed to the reception data judgment unit 16, after the RPR-MAC address learning table 20A is created. The reception data judgment unit 16 passes the RPR data packet to the transmission ring selector 11 and the transmission position judgment unit 18.

The transmission ring selector 11, when receiving the RPR data packet, carries out the operations similar to the operations of the RPR device 5. Thus, the explanation is omitted.

The transmission position judgment unit 18 having received the RPR data packet from the reception data judgment unit 16 removes the RPR header, and in accordance with the VLAN-ID=1 of the VLAN tag and the destination MAC address (=FF-FF-FF-FF-FF-FF) of the ARP request packet, broadcast-transmits the ARP request packet only to the user devices D and E under the administration of the RPR device 6 corresponding to them.

Thus, the ARP request packets arrive at the user devices D and E through the bridge Y, respectively. In this way, the ARP request packet from the router X can be received by the user device E.

As mentioned above, the VLAN-ID set for each of the RPR devices 1 to 6 (at least the RPR devices 4 to 6) enables each of the RPR devices 4 to 6 to filter the RPR data packets so as to capture only the RPR data packet addressed to the RPR device itself.

Note that, after that, the user device E creates the ARP response packet having its MAC address and transmits it to the router X. The operations after that are similar to the first operation example. Thus, the explanations are omitted.

EFFECT OF EMBODIMENT

According to the embodiment, the plurality of RPR devices, each of which accommodates the user device, is connected to the RPR ring network. Each RPR device has the RPR-MAC address learning table which registration unit s the correspondence between the MAC address of each RPR device and the MAC address of the user device included in the RPR device.

Thus, each RPR device can recognize which user device is accommodated in which RPR device. Hence, each RPR device can determine the corresponding RPR device address (the RPR device accommodating the user device corresponding to the destination) from the destination address of the packet included in the RPR device itself to be set for the RPR header as the destination MAC address.

For this reason, each RPR device does not need to transmit the RPR data packet by broadcast, if the destination MAC address which is not broadcast address is set for the packet.

Consequently, the RPR device functioning as the relaying node for the RPR data packet (the RPR device 5 in the first and second operation examples) captures the RPR data packet, and may not send it to a local network (user device network) that the RPR device itself accommodates. Thus, flooding is suppressed.

Moreover, according to the embodiment, the usage of the L2 grouping identifier enables each RPR device to filter (reject capturing) the RPR data packets other than the packets addressed to the RPR device itself (the self-node).

Thus, each RPR device may not learn the correspondence between the transmission source RPR-MAC address to the RPR data packet other than the packets addressed to the self-node and the transmission source MAC address nor carry out the registration process. Hence, the reduction in the processing load for the RPR device and the effective utilization of resource can be attained.

Also, according to the embodiment, the RPR device 4, when receiving the ARP request packet from the router X, transmits the RPR data packet of the broadcast specification including the ARP request, to the RPR network, without returning to the router X the ARP response packet including its MAC address for this ARP request packet.

Thus, each RPR device on the RPR network can receive the RPR data packet and learn that the RPR device 4 includes the router X, and the RPR device 6 removes the RPR header from the RPR data packet and transmits the ARP packet to the network (local network) on the user device side.

Thus, the broadcast packet requesting the reception of the user device E and transmitted from the router X (the ARP request packet) is received by the user device E. After that, the ARP response packet addressed to the router X is transferred to the router X through the RPR device 4 without any broadcast in the RPR network in accordance with the learning result in each RPR device.

In this way, the RPR network in the embodiment functions as the network of the L2 level accommodating the user device. Each RPR device can attain the transmission/reception of the data between the user devices by carrying out the process (based on the MAC address transfer control) of the L2 level.

That is, even if each RPR device does not create the routing table, terminate L3 (IP), and perform the transfer control of the packet based on the L3 routing table, the transmission/reception of the data between the user devices can be attained. Thus, it is not necessary to install the L3 function in the RPR device.

Also, as the information used for the transfer control and learning function in the RPR network, it is enough to use the standard MAC address and RPR-MAC address and VLAN tag. Thus, as the user device included in the RPR device, it is not necessary to use ones requiring any special format.

Also, according to the embodiment, each RPR device can include both of the user device (user device E) of the L2 level and the user device (router X) of the L3 level, as the user device. The communication between the user devices can be attained by the same operation for those user devices.

Moreover, according to the embodiment, there are the following merits.

<1> The L3 function is not inevitable by using the L2-RPR mapping table (the RPR-MAC address learning table), such as a port address correspondence table or the like, for the network routing.

For this reason, it is not necessary to install the hardware and software to give the L3 function to the RPR device. Thus, the cost of the RPR device can be largely suppressed.

<2> The RPR device according to the embodiment does not have the L3 function. Thus, it is not necessary to perform the complex maintenance and operation on the RPR device. Hence, the cost for the maintenance and operation can be largely reduced.

<3> Since the correspondences between the destination RPR-MAC and the L2-MAC/other identifiers under its administration are summarized into a table, when the encapsulation control of the special header is performed, the direct connection to the RPR device is impossible. On the contrary, according to the embodiment, the target MAC addresses are summarized into a table. Thus, the direct connection to the RPR device becomes possible.

INDUSTRIAL APPLICABILITY

The present invention can be applied to the plurality of transmitting devices (RPR devices) connected to, for example, the RPR ring network, each of which accommodates the user device and functions as the relaying node when the data is transmitted and received between the user devices.

What is claimed is:

1. A resilient packet ring (RPR) device, which is connected to one or more rings to constitute an RPR network, comprising:
   a storage unit for registering a correspondence between RPR device addresses, each indicating an RPR device connected to said one or more rings and user device addresses, each indicating a user device accommodated in the RPR device;
   a transfer control unit receiving data, which is addressed to a predetermined user device, from a user device accommodated in the RPR device itself, and when an RPR device address of an RPR device accommodating the predetermined user device is registered in the storage unit, adding an RPR header, in which the RPR device address is set as a destination RPR device address, to the data;

a unit transmitting the data with the RPR header to the RPR network;

a receiving unit receiving the data with the RPR header from the RPR network; and an address learning unit receiving at least a transmission source address of the data with the RPR header and a transmission source RPR device address set for the RPR header from the receiving unit, and when the transmission source address is not registered in the storage unit, registering correspondence between the transmission source address and the transmission source RPR device address to the storage unit.

2. The RPR device according to claim 1, wherein the address learning unit includes:

a judgment unit judging whether or not the transmission source address of the data with the RPR header received by the receiving unit is registered in the storage unit; and a registration unit, when the transmission source address of the data with the RPR header is not stored, registering a correspondence between the transmission source address of the data with the RPR header and the transmission source RPR device address set for the RPR header to the storage unit.

3. The RPR device according to claim 1, wherein the transfer control unit includes:

a retrieving unit retrieving a corresponding RPR device address from the storage unit by using, as a retrieval key, a transmission destination address of the data addressed to the predetermined user device; and an adding unit, when the corresponding RPR device address is retrieved, adding the RPR header, in which the corresponding RPR device address is set as the destination RPR device address, to the data.

4. The RPR device according to claim 1, wherein the receiving unit does not pass at least the transmission source address of the data and the transmission source RPR device address set for the RPR header to the address learning means, when a group identifier set for the data with the RPR header received from the RPR network is not coincident with a group identifier of a group to which the user device accommodated in the RPR device itself belongs.

5. The RPR device according to claim 1, wherein the user device address and the RPR device address include media access control (MAC) addresses.

6. The RPR device according to claim 4, wherein the group identifier includes a layer 2 grouping identifier.

7. The RPR device according to claim 6, wherein the layer 2 grouping identifier comprises a virtual local area network (VLAN) ID.

8. A resilient packet ring (RPR) network system, comprising:

a plurality of RPR devices including first and second RPR devices each accommodating one or more user devices; and one or more rings to which the RPR divides are connected, the first RPR device, when receiving, from a first user device accommodated in the first RPR device itself, a broadcast packet desiring an arrival at a second user device accommodated in the second RPR device, adding an RPR header, in which a transmission source RPR device address is an address of the first RPR device and a destination RPR device address is a broadcast address, to the packet to be transmitted to an RPR network, the second RPR device, when receiving the packet with the RPR header from the first RPR device via the RPR network, on the basis of the transmission source RPR device address in the RPR header and the address of the first user device set as the transmission source address for the packet, learning that the first RPR device accommodates the first user device, removing the RPR header from the packet, and transmitting the packet to the second user device, the second RPR device, when receiving a packet addressed to the first user device from the second user device, adding an RPR header, in which the RPR device address of the first RPR device that has been already learned is set as the destination RPR device address, to the packet to be transmitted to the RPR network, and the first RPR device, when receiving the packet with the RPR header from the second RPR device via the RPR network, transmitting the packet to the first user device after removing the RPR header from the packet.

9. The RPR network system according to claim 8, wherein the first RPR device, when receiving the packet with the RPR header from the second RPR device, on the basis of the RPR device address of the second RPR device set as the transmission source RPR device address for the RPR header, and the address of the second user device set as the transmission source address of the packet, learning that the second RPR device accommodates the second user device, and when receiving the packet, in which the address of the second user device is set as the destination address, from the first user device, transmitting the packet to the RPR network after adding the RPR header, in which the RPR device address of the second RPR device that has been already learned is set as the destination RPR device address.

10. The RPR network system according to claim 9, wherein an RPR device relaying the packet with the RPR header, which is transferred between the first RPR device and the second RPR device, when receiving the packet with the RPR header from the first or second RPR device, on the basis of a transmission source RPR device address and a transmission source address set for the packet with the RPR header, learning that a user device specified by the transmission source address is accommodated in an RPR device specified by the transmission source RPR device address.

11. The RPR network system according to claim 10, wherein a packet, which is transmitted and received between user devices, which are accommodated in different RPR devices, includes a layer 2 grouping identifier indicating a layer 2 group to which the user devices respectively belong; and each of the plurality of RPR devices holds the layer 2 grouping identifier of the user devices accommodated in the RPR device itself, and when a layer 2 grouping identifier different from the layer 2 grouping identifier held by the RPR device itself is set for the packet with the RPR header received from the RPR network, does not perform capturing the packet with the RPR header and the learning.

12. A data transfer method for a resilient packet ring (RPR) device that is connected to one or more rings to constitute an RPR network, the method comprising:

receiving data addressed to a predetermined user device, which is received from a user device accommodated in the RPR device itself;

when an RPR device address of an RPR device accommodating the predetermined user device is registered in a storage unit for registering a correspondence between an RPR device address, each indicating an RPR device connected to said one or more rings, and user device addresses, each indicating a user device accommodated in the RPR device, adding the RPR header in which the RPR device address is set as the destination RPR device address, to the data;

transmitting the data with the RPR header to the RPR network;

receiving the data with the RPR header from the RPR network; and when a transmission source address of the received data is not registered in the storage unit, registering a correspondence between the transmission source address and a transmission source RPR device address to the storage unit.

13. The data transfer method for an RPR device according to claim 12, further comprising:

judging whether or not the transmission source address of the data with the RPR header received from the RPR network is registered in the storage unit; and when the transmission source address is not stored, registering a correspondence between the transmission source address and a transmission source RPR device address set for the RPR header to the storage unit.

14. The data transfer method for an RPR device according to claim 12, further comprising:

retrieving a corresponding RPR device address by using, as a retrieval key, a transmission destination address of the data addressed to the predetermined user device; and when the corresponding RPR device address is retrieved, adding the RPR header, in which the corresponding RPR device address is set as the destination RPR device address, to the data.

15. The data transfer method for an RPR device according to claim 12, wherein when a group identifier set for the data with the RPR header received from the RPR network is not coincident with a group identifier assigned to the user device accommodated in the RPR device itself, a process for registering a transmission source address of the data and a transmission source RPR device address set for the RPR header to the storage unit is not performed.

16. The data transfer method for an RPR device according to claim 12, wherein the user device address and the RPR device address includes media access control (MAC) addresses.

17. The data transfer method for an RPR device according to claim 15, wherein the group identifier comprises a layer 2 grouping identifier.

18. The data transfer method for an RPR device according to claim 17, wherein the layer 2 grouping identifier comprises a virtual local area network (VLAN) ID.

19. A data transfer method for a resilient packet ring (RPR) network system in which a plurality of RPR devices including first and second RPR devices accommodating one or more user devices are connected to one or more rings to constitute an RPR network, the method comprising:

when the first RPR device receives a broadcast packet desiring an arrival at a second user device accommodated in the second RPR device from a first user device accommodated in the first RPR device, the first RPR device transmitting the packet to the RPR network after adding an RPR header to the packet, the RPR header having an RPR device address of the first RPR device as a transmission source address and a broadcast address as a destination address;

when the second RPR device receives the packet with the RPR header from the first RPR device via the RPR network, the second RPR device, based on the transmission source RPR device address of the RPR header and an address of the first user device set as the transmission source address for the packet, learning that the first RPR device accommodates the first user device and transmitting the packet to the second user device after removing the RPR header from the packet;

when the second RPR device receives a packet addressed to the first user device from the second user device, the second RPR device adding the RPR header, in which the RPR device address of the first RPR device that has been already learned is set as the destination RPR device address, to the packet and transmitting the packet with the RPR header to the RPR network; and when the first RPR device receives the packet with the RPR header from the second RPR device via the RPR network, the first RPR device the packet to the first user device after removing the RPR header from the packet.

20. The data transfer method for an RPR network system according to claim 19, further comprising:

when the first RPR device receives the packet with the RPR header from the second RPR device, the first RPR device, based on the RPR device address of the second RPR device set as the transmission source RPR device address for the RPR header, and the address of the second user device set as the transmission source address of the packet, learning that the second RPR device accommodates the second user device; and when the first RPR device receives a packet in which the address of the second user device as a destination address is set from the first user device, the first RPR device adding an RPR header, in which the RPR device address of the second RPR device that has been already learned is set as the destination RPR device address, to the packet, and transmitting the packet with the RPR header to the RPR network.

21. The data transfer method for an RPR network system according to claim 20, further comprising, when an RPR device for relaying the packet with the RPR header, which is transferred between the first RPR device and the second RPR device, receives the packet with the RPR header from the first or second RPR device, the RPR device, based on a transmission source RPR device address and a transmission source address set for the packet with the RPR header, learning that a user device specified by the transmission source address is accommodated in an RPR device specified by the transmission source RPR device address.

22. The data transfer method for an RPR network system according to claim 21, wherein a packet, which is transmitted and received between user devices, which are accommodated in different RPR devices, includes a layer 2 grouping identifier indicating a layer 2 group to which the user devices respectively belong; and each of the plurality of RPR devices holds the layer 2 grouping identifier of the user devices accommodated in the RPR device itself, and when a layer 2 grouping identifier different from the layer 2 grouping identifier held by the RPR device itself is set for the packet with the RPR header received from the RPR network, does not perform capturing the packet with the RPR header and the learning.

* * * * *

UNITED STATES PATENT AND TRADEMARK OFFICE
CERTIFICATE OF CORRECTION

PATENT NO. : 7,532,634 B2
APPLICATION NO. : 11/054538
DATED : May 12, 2009
INVENTOR(S) : Atsuko Higashitaniguchi et al.

Page 1 of 1

It is certified that error appears in the above-identified patent and that said Letters Patent is hereby corrected as shown below:

Title Page, Item (57), Abstract, Line 1, change "network" to --ring--.

Signed and Sealed this

Fourth Day of August, 2009

JOHN DOLL
*Acting Director of the United States Patent and Trademark Office*